US00RE46294E

(19) United States
(12) Reissued Patent
Watanabe et al.

(10) Patent Number: US RE46,294 E
(45) Date of Reissued Patent: Jan. 31, 2017

(54) VARIABLE DISPLACEMENT PUMP

(71) Applicant: HITACHI AUTOMOTIVE SYSTEMS, LTD., Hitachinaka-shi, Ibaraki (JP)

(72) Inventors: Yasushi Watanabe, Kanagawa (JP); Hideaki Ohnishi, Atsugi (JP); Atsushi Naganuma, Atsugi (JP)

(73) Assignee: HITACHI AUTOMOTIVE SYSTEMS, LTD., Hitachinaka-Shi (JP)

(21) Appl. No.: 15/085,797

(22) Filed: Mar. 30, 2016

Related U.S. Patent Documents

Reissue of:

(64) Patent No.: 8,684,702
Issued: Apr. 1, 2014
Appl. No.: 12/719,147
Filed: Mar. 8, 2010

(30) Foreign Application Priority Data

Mar. 9, 2009 (JP) ..... 2009-054366

(51) Int. Cl.

*F04B 49/00* (2006.01)
*F04C 14/22* (2006.01)
*F04C 2/344* (2006.01)

(52) U.S. Cl.

CPC ..... *F04C 14/223* (2013.01); *F04C 14/226* (2013.01); *F04C 2/3442* (2013.01); *F04C 2210/14* (2013.01)

(58) Field of Classification Search

CPC ..... F04C 14/223; F04C 14/226; F04C 2/3442; F04C 2210/14

(Continued)

(56) References Cited

U.S. PATENT DOCUMENTS 4,342,545 A * 8/1982 Schuster ..... F04C 14/226 418/26
4,531,893 A * 7/1985 Okoh et al. ..... 417/220

(Continued)

FOREIGN PATENT DOCUMENTS

JP 53-137403 11/1978
JP S53-137403 11/1978

(Continued)

OTHER PUBLICATIONS

Final Office Action in U.S. Appl. No. 12/719,147 dated Mar. 15, 2013.

(Continued)

*Primary Examiner* — William Doerrler
(74) *Attorney, Agent, or Firm* — Foley & Lardner LLP

(57) ABSTRACT

A variable displacement oil pump for an automotive engine. The oil pump includes a cam ring accommodating thereinside a pump element having a rotor. The cam ring is swingingly movably accommodated in a housing and biased in a direction to increase an eccentricity amount of the cam ring relative to the axis of the rotor by a biasing member. First and second pressure chambers are defined inside the housing by the outer peripheral section of the cam ring. The first pressure chamber is supplied with a discharge pressure to be applied to the cam ring to oppose to a biasing force of the biasing member. The second pressure chamber is supplied with the discharge pressure to be applied to the cam ring to assist the biasing force of the biasing member. Additionally, a control device is provided for controlling (Continued)

supply of the discharge pressure to the second pressure chamber.

26 Claims, 15 Drawing Sheets

(58) Field of Classification Search
USPC ..... 417/220; 418/26, 27
See application file for complete search history.

(56) References Cited

U.S. PATENT DOCUMENTS

| | | | | |
|---|---|---|---|---|
| 5,090,881 | A * | 2/1992 | Suzuki | F04C 14/226 418/26 |
| 6,623,250 | B2 | 9/2003 | Zagranski et al. | |
| 6,786,702 | B2 | 9/2004 | Zagranski et al. | |
| 7,549,848 | B2 | 6/2009 | Scholl | |
| 7,614,858 | B2 * | 11/2009 | Tanasuca | 418/26 |
| 8,047,822 | B2 | 11/2011 | Shulver et al. | |
| 2001/0031204 | A1 * | 10/2001 | Oba et al. | 417/220 |
| 2002/0192081 | A1 * | 12/2002 | Okada et al. | 417/213 |
| 2007/0212243 | A1 * | 9/2007 | Yamamuro et al. | 418/30 |
| 2008/0107554 | A1 * | 5/2008 | Shulver et al. | 418/26 |
| 2009/0074598 | A1 * | 3/2009 | Tanasuca | F01C 21/0827 418/27 |
| 2010/0221126 | A1 * | 9/2010 | Tanasuca et al. | 417/218 |
| 2013/0251570 | A1 | 9/2013 | Tanasuca et al. | |

FOREIGN PATENT DOCUMENTS

| | | |
|---|---|---|
| JP | 3-119589 | 12/1991 |
| JP | 03-119589 U | 12/1991 |
| JP | 2005-520096 | 7/2005 |
| JP | 2008-524500 | 7/2008 |

OTHER PUBLICATIONS

Final Office Action issued in U.S. Appl. No. 14/186,464 DTD Dec. 31, 2014.

Non-Final Office Action in U.S. Appl. No. 12/719,147 dated Oct. 24, 2012.

Non-Final Office Action in U.S. Appl. No. 14/186,464 dated Aug. 12, 2014.

Notice of Allowance dated Nov. 19, 2013 in U.S. Appl. No. 12/719,147.

Notice of Allowance issued in U.S. Appl. No. 14/186,464 DTD May 8, 2015.

Office Action issued in corresponding Japanese application No. 2009-0524366 issued Aug. 30, 2012.

Translation of JP 03-119589, published Dec. 10, 1991.

JP Office Action for Japanese application No. 2009-054366, issued on Aug. 30, 2012.

* cited by examiner

VARIABLE DISPLACEMENT PUMP

Matter enclosed in heavy brackets [ ] appears in the original patent but forms no part of this reissue specification; matter printed in italics indicates the additions made by reissue; a claim printed with strikethrough indicates that the claim was canceled, disclaimed, or held invalid by a prior post-patent action or proceeding.

BACKGROUND OF THE INVENTION

This invention relates to a variable displacement pump which is applied, for example, to a hydraulic pressure source for supplying hydraulic oil to various sliding sections and the like of an automotive internal combustion engine, and more particularly to the variable displacement pump whose discharge amount (discharge pressure) is variable in accordance with engine operating conditions.

As a conventional variable displacement pump to be used for an oil pump of an automotive vehicle, there is proposed one disclosed in International Application Publication (Tokuhyou) No. 2008-524500. In summary, this variable displacement pump is of a so-called vane type and arranged such that a discharge pressure is selectively supplied to two pressure chambers defined between a housing and a cam ring so as to control the eccentricity amount of the cam ring which is always biased in a direction to be eccentric relative to the center axis of a rotor, thereby rendering the discharge amount (discharge pressure) variable.

SUMMARY OF THE INVENTION

However, the above-mentioned conventional variable displacement pump takes such a structure that the biasing force of the spring is balanced with a hydraulic pressure force based on the internal pressures (discharge pressures) of the above two pressure chambers. Accordingly, it is required to increase the biasing force of the spring, thereby raising a problem of unavoidably making the pump large-sized.

An object of the present invention is to provide an improved variable displacement oil pump which can overcome drawbacks encountered in conventional variable displacement pumps.

Another object of the present invention is to provide an improved variable displacement oil pump which is small-sized as compared with the conventional variable displacement oil pumps.

A further object of the present invention is to provide an improved variable displacement oil pump of a so-called vane type, provided with first and second pressure chambers defined outside a cam ring and supplied therein with a discharge pressure, in which the first pressure chamber has a first pressure receiving surface for causing the discharge pressure to act on the cam ring in a direction to decrease the eccentricity amount of the cam ring, and the second pressure chamber has a second pressure receiving surface for causing the discharge pressure to act on the cam ring in a direction to increase the eccentricity amount of the cam ring.

Thus, the variable displacement oil pump according to the present invention is arranged such that the eccentricity amount of the cam ring is controlled by balancing the internal pressures of the first and second pressure chambers. Consequently, a biasing member such a spring for biasing the cam ring is not necessarily required, or the biasing force of the biasing member is not required to be large even if the biasing member is used, thus effectively making the oil pump small-sized.

A first aspect of the present invention resides in a variable displacement oil pump comprising a pump element including a rotor rotationally driven by an internal combustion engine, and a plurality of vanes disposed at an outer peripheral section of the rotor to be projectable from and retractable in the outer peripheral section. A cam ring is provided having an outer peripheral section for accommodating the pump element thereinside, and an outer peripheral section having a swinging movement fulcrum, the cam ring being swingingly movable around the swinging movement fulcrum to change an eccentricity amount of the cam ring relative to an axis of the rotor. Side walls are disposed respectively on axially opposite sides of the cam ring to define a plurality of hydraulic fluid chambers each of which is defined by the rotor and the adjacent vanes. A housing is provided for accommodating the cam ring thereinside and including a discharge section opened through at least one of the side walls to a discharge region in which volumes of the hydraulic fluid chambers decrease along a rotational direction of the rotor, and a suction section opened through at least one of the side walls to a suction region in which volumes of the hydraulic chambers increase along the rotational direction of the rotor. A biasing member is provided for biasing the cam ring in a direction to increase the eccentricity amount of the cam ring relative to the axis of the rotor. A first pressure chamber defined is by the outer peripheral section of the cam ring having a first pressure receiving surface, a discharge pressure being introduced into the first pressure chamber to allow the discharge pressure to be applied through the first pressure receiving surface to the cam ring to oppose to a biasing force of the biasing member so as to provide the cam ring with a swinging force in a direction to decrease the eccentricity amount of the cam ring. A second pressure chamber defined is by the outer peripheral section of the cam ring having a second pressure receiving surface, the discharge pressure being introduced into the first pressure chamber to allow the discharge pressure to be applied through the second pressure receiving surface to the cam ring to assist the biasing force of the biasing member so as to provide the cam ring with a swinging force in a direction to increase the eccentricity amount of the cam ring. Additionally, a control device is provided for controlling supply of the discharge pressure to the second pressure chamber.

A second aspect of the present invention resides in a variable displacement oil pump comprising a pump element including a rotor rotationally driven by an internal combustion engine, and a plurality of vanes disposed at an outer peripheral section of the rotor to be projectable from and retractable in the outer peripheral section. A cam ring is provided having an outer peripheral section for accommodating the pump element thereinside, and an outer peripheral section having a swinging movement fulcrum, the cam ring being swingingly movable around the swinging movement fulcrum to change an eccentricity amount of the cam ring relative to an axis of the rotor. Side walls are disposed respectively on axially opposite sides of the cam ring to define a plurality of hydraulic fluid chambers each of which is defined by the rotor and the adjacent vanes. A housing is provided for accommodating the cam ring thereinside and including a discharge section opened through at least one of the side walls to a discharge region in which volumes of the hydraulic fluid chambers decrease along a rotational direction of the rotor, and a suction section opened through at least one of the side walls to a suction region in which volumes of the hydraulic chambers increase along the rotational direction of the rotor. A biasing member is provided for biasing the cam ring in a direction to increase the eccentricity amount of the cam ring relative to the axis of the rotor. A first pressure chamber defined is by the outer peripheral section of the cam ring having a first pressure receiving surface, a discharge pressure being introduced into the first pressure chamber to allow the discharge pressure to be applied through the first pressure receiving surface to the cam ring to oppose to a biasing force of the biasing member so as to provide the cam ring with a swinging force in a direction to decrease the eccentricity amount of the cam ring. A second pressure chamber defined is by the outer peripheral section of the cam ring having a second pressure receiving surface, the discharge pressure being introduced into the first pressure chamber to allow the discharge pressure to be applied through the second pressure receiving surface to the cam ring to assist the biasing force of the biasing member so as to provide the cam ring with a swinging force in a direction to increase the eccentricity amount of the cam ring. Additionally, a control device is provided for controlling supply of the discharge pressure to the second pressure chamber. In the above oil pump, a part of each of the first and second pressure chambers is disposed overlapping with the discharge region in a radial direction of the rotor.

A third aspect of the present invention resides in a variable displacement oil pump comprising a pump element including a rotor rotationally driven by an internal combustion engine, and a plurality of vanes disposed at an outer peripheral section of the rotor to be projectable from and retractable in the outer peripheral section. A cam ring is provided having an outer peripheral section for accommodating the pump element thereinside, and an outer peripheral section having a swinging movement fulcrum, the cam ring being swingingly movable around the swinging movement fulcrum to change an eccentricity amount of the cam ring relative to an axis of the rotor. Side walls are disposed respectively on axially opposite sides of the cam ring to define a plurality of hydraulic fluid chambers each of which is defined by the rotor and the adjacent vanes. A housing is provided for accommodating the cam ring thereinside and including a discharge section opened through at least one of the side walls to a discharge region in which volumes of the hydraulic fluid chambers decrease along a rotational direction of the rotor, and a suction section opened through at least one of the side walls to a suction region in which volumes of the hydraulic chambers increase along the rotational direction of the rotor. A biasing member is provided for biasing the cam ring in a direction to increase the eccentricity amount of the cam ring relative to the axis of the rotor. A first pressure chamber defined is by the outer peripheral section of the cam ring having a first pressure receiving surface, a discharge pressure being introduced into the first pressure chamber to allow the discharge pressure to be applied through the first pressure receiving surface to the cam ring to oppose to a biasing force of the biasing member so as to provide the cam ring with a swinging force in a direction to decrease the eccentricity amount of the cam ring. A second pressure chamber defined is by the outer peripheral section of the cam ring having a second pressure receiving surface, the discharge pressure being introduced into the first pressure chamber to allow the discharge pressure to be applied through the second pressure receiving surface to the cam ring to assist the biasing force of the biasing member so as to provide the cam ring with a swinging force in a direction to increase the eccentricity amount of the cam ring. Additionally, a control device is provided for controlling supply of the discharge pressure to the second pressure chamber. In the above oil pump, the first and second pressure chambers are disposed nearer to the swinging movement fulcrum than to the axis of the cam ring.

A fourth aspect of the present invention resides in a variable displacement oil pump comprising a pump element including a rotor rotationally driven by an internal combustion engine, and a plurality of vanes disposed at an outer peripheral section of the rotor to be projectable from and retractable in the outer peripheral section. A cam ring is provided having an outer peripheral section for accommodating the pump element thereinside, and an outer peripheral section having a swinging movement fulcrum, the cam ring being swingingly movable around the swinging movement fulcrum to change an eccentricity amount of the cam ring relative to an axis of the rotor. Side walls are disposed respectively on axially opposite sides of the cam ring to define a plurality of hydraulic fluid chambers each of which is defined by the rotor and the adjacent vanes. A housing is provided for accommodating the cam ring thereinside and including a discharge section opened through at least one of the side walls to a discharge region in which volumes of the hydraulic fluid chambers decrease along a rotational direction of the rotor, and a suction section opened through at least one of the side walls to a suction region in which volumes of the hydraulic chambers increase along the rotational direction of the rotor. A first pressure chamber defined is by the outer peripheral section of the cam ring having a first pressure receiving surface, a discharge pressure being introduced into the first pressure chamber to allow the discharge pressure to be applied through the first pressure receiving surface to the cam ring to oppose to a biasing force of the biasing member so as to provide the cam ring with a swinging force in a direction to decrease the eccentricity amount of the cam ring. A second pressure chamber defined is by the outer peripheral section of the cam ring having a second pressure receiving surface, the discharge pressure being introduced into the first pressure chamber to allow the discharge pressure to be applied through the second pressure receiving surface to the cam ring to assist the biasing force of the biasing member so as to provide the cam ring with a swinging force in a direction to increase the eccentricity amount of the cam ring. Additionally, a control device is provided for controlling supply of the discharge pressure to the second pressure chamber. In the above oil pump, the first pressure receiving surface is set larger in area than the second pressure receiving surface.

The other objects and features of this invention will become understood from the following description with reference to the accompanying drawings.

BRIEF DESCRIPTION OF THE DRAWINGS

In the drawings, like reference numerals designate like parts and elements throughout all figures, in which.

DETAILED DESCRIPTION OF THE INVENTION

Figure 1:
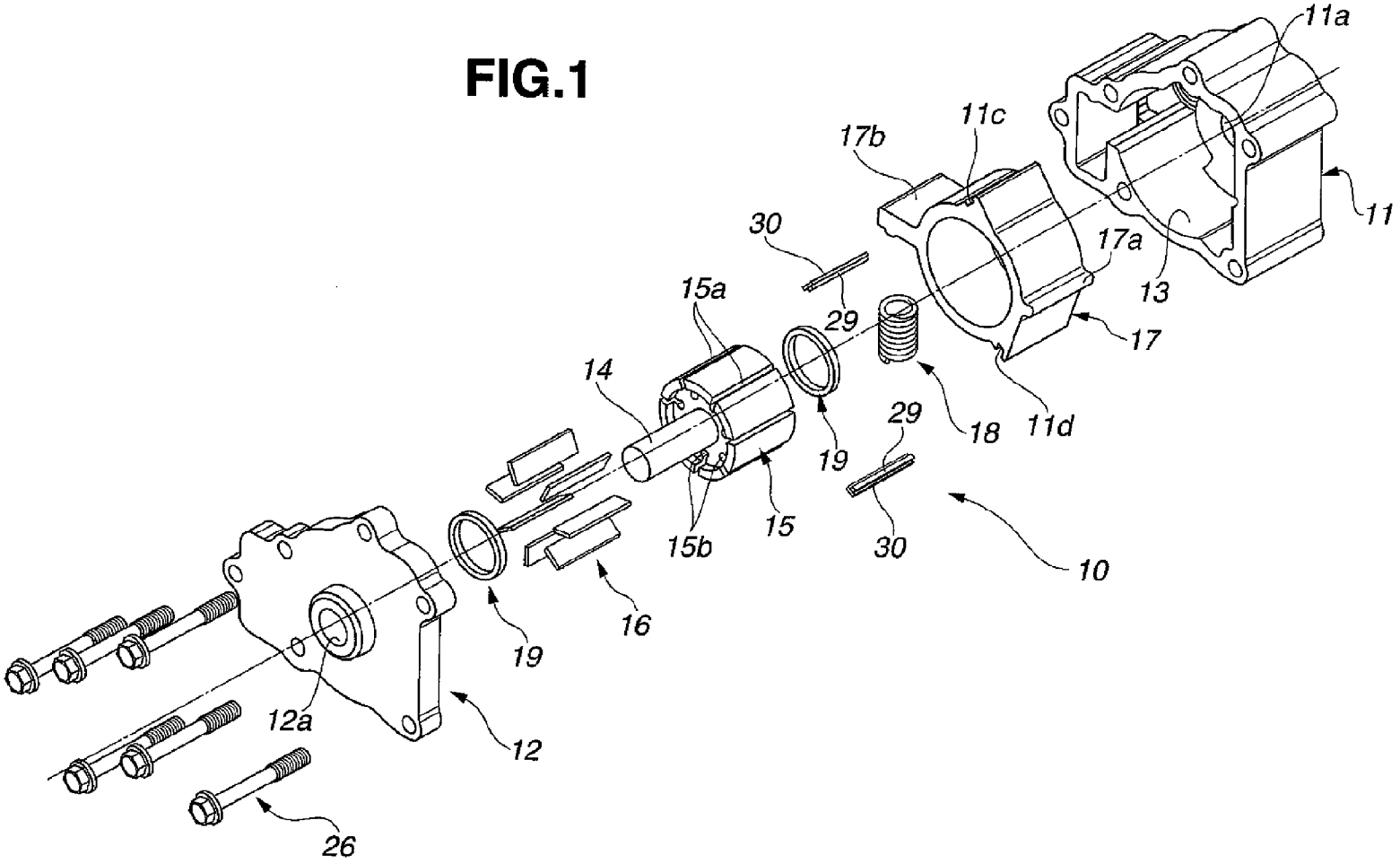
FIG. 1 is a perspective exploded view of a first embodiment of a variable displacement oil pump according to the present invention.
Figure 2:
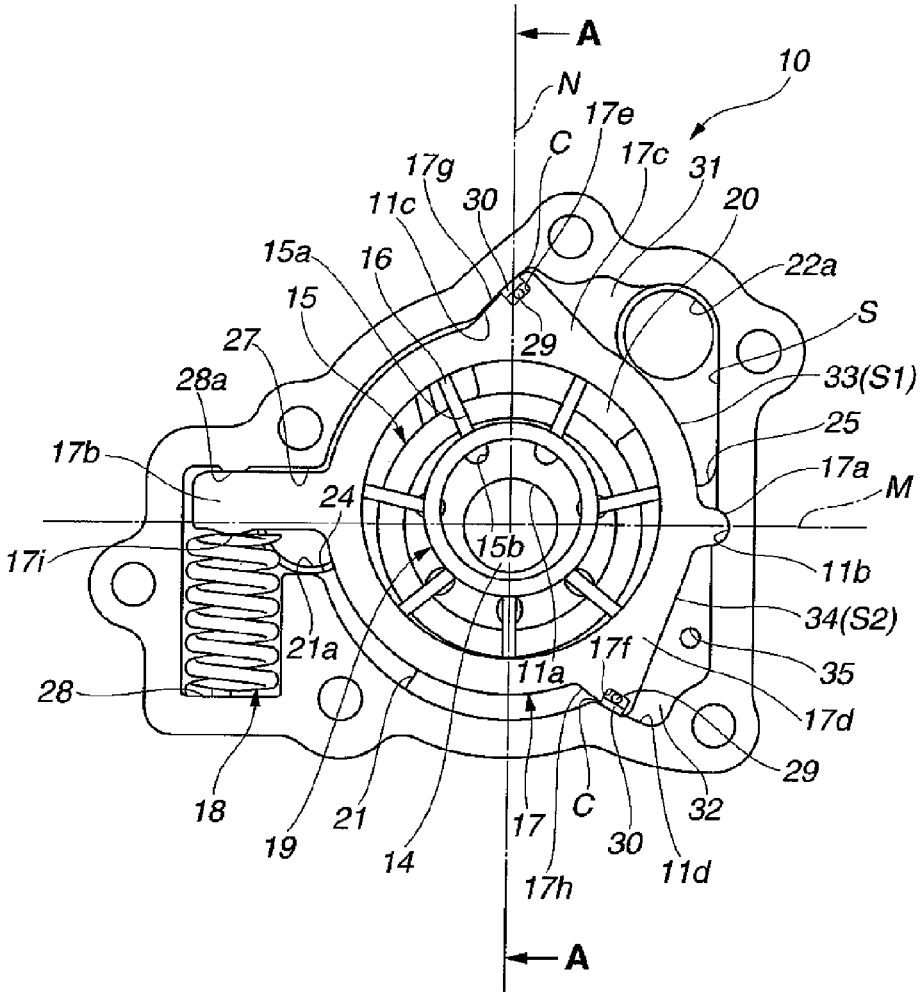
FIG. 2 is a front view of the variable displacement oil pump of FIG. 1 in a state where a cover member is removed, showing a condition where the eccentricity amount of a cam ring is the maximum.
Figure 3:
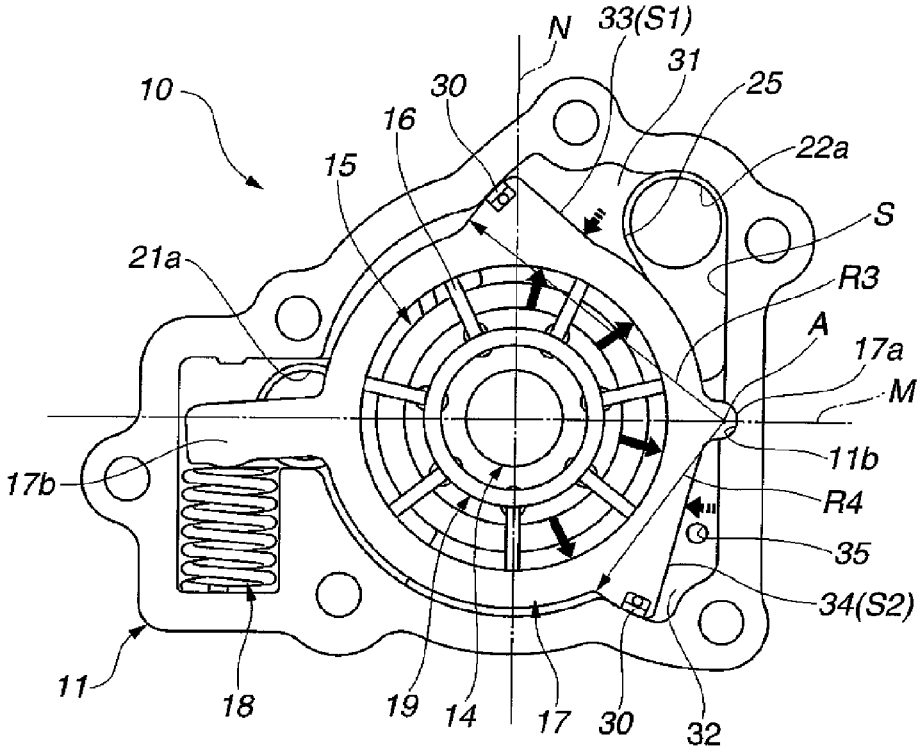
FIG. 3 is a front view similar to FIG. 2 but showing a condition where the eccentricity amount of the cam ring is the minimum.

Referring now to FIGS. 1 to 9 of the drawings, a first embodiment of a variable displacement oil pump according to the present invention is illustrated by the reference numeral 10. As shown in FIGS. 1 to 3, oil pump 10 is disposed at a front end section or the like of a cylinder block of an automotive internal combustion engine and includes a housing (no numeral) which has container-shaped pump body 11 which is formed to be opened at its one end and formed thereinside with pump accommodating chamber 13 as a cylindrical space. Cover member 12 closes the opening at the one end of pump body 11. Drive shaft 14 is rotatably supported by the housing and passes through an about central portion of pump accommodating chamber 13 so as to be rotationally driven by a crankshaft of the engine. Pump element (no numeral) includes rotor 15 which is rotatably disposed inside pump accommodating chamber 13 and has a central section connected to drive shaft 14. Vanes 16 are respectively disposed projectable from and retractable in slits 15a which are formed as cutouts at an outer peripheral section of rotor 15 in a manner to extend radially outwardly. Cam ring 17 is disposed at an outer peripheral side of the pump element to be capable of being eccentric relative to a center or rotational axis of rotor 15 and defines pump chambers 20 as hydraulic fluid chambers upon cooperation with rotor 15 and adjacent vanes 16, 16. In other words, the pump element is disposed inside an inner peripheral section of cam ring 17. Spring 18 as a biasing member is accommodated within pump body 11 and normally biases cam ring 17 in a direction to increase an eccentricity amount of cam ring 17 relative to the center axis of rotor 15. Two ring members 19, 19 are slidably disposed respectively at the opposite side sections of rotor 15 and located radially inside of the outer peripheries of rotor 15, each ring member having an outer diameter smaller than rotor 15.

Figure 4:
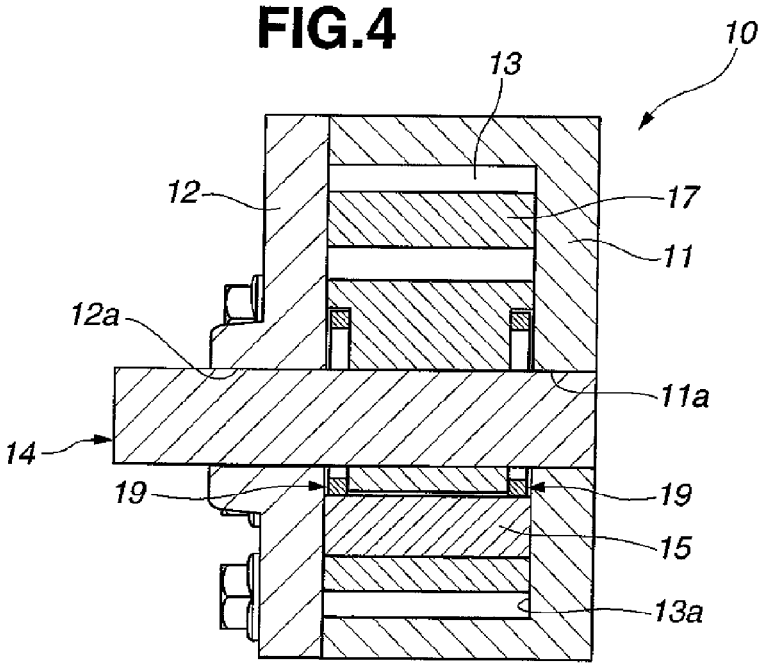
FIG. 4 is a cross-sectional view taken substantially along the line A-A of FIG. 2.
Figure 5:
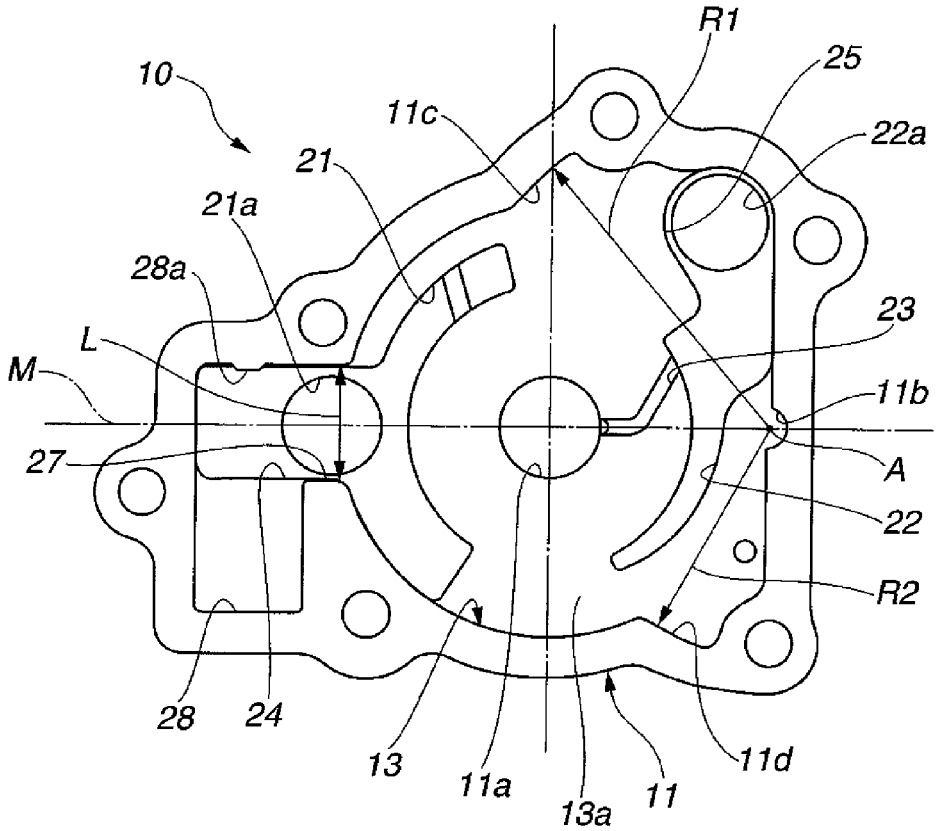
FIG. 5 is a front view of a housing of the variable displacement oil pump of FIG. 1, showing the inside of the housing.

Pump body 11 is formed of aluminum alloy as a single body and has a bearing hole 11a which is formed at the about central portion of bottom wall 13a of the pump accommodating chamber 13 so as to pierce bottom wall 13a in order to rotatably support one end section of drive shaft 14 as shown in FIGS. 4 and 5. Support groove 11b is semicylindrical and is formed as a cutout at a certain position of the inner peripheral wall of pump accommodating chamber 13 or of pump body 11 in order to swingably support cam ring 17 as shown in FIG. 5. Additionally, first and second seal sliding surfaces 11c, 11d are formed on the opposite sides of flat plane M (referred hereinafter to as "cam ring standard plane") connecting the center axis of the bearing hole 11a and the center axis A of support groove 11b as shown in FIGS. 3 and 5. The center axis A lies on a plane including an inner peripheral surface S of the pump body 11 as shown in FIGS. 3 and 4. Seal members 30, 30 discussed after are respectively in slidable contact with first and second seal sliding surfaces 11c, 11d. Each of these seal sliding surfaces 11c, 11d is formed arcuate in cross-section to form part of a cylinder which has center axis A and has a certain radius R1, R2 on a cross-sectional plane perpendicular to the center axis of the bearing hole 11a as shown in FIG. 5. Each of sealing-sliding surfaces 11c, 11d is set to have such a peripheral length that each seal member 30 is always in slidable contact with the seal sliding surface 11c within an eccentrically swingable range of cam ring 17. By this, when cam ring 17 makes its eccentrically swinging movement, the cam ring is slidably guided along respective seal sliding surfaces 11c, 11d so as to accomplish a smooth operation (eccentrically swinging movement) of cam ring 17.

Additionally, as shown in FIGS. 2 and 5, bottom wall 13a of pump accommodating chamber 13 is formed with suction port 21 serving as a suction section and with discharge port 22 serving as a discharge section, the suction and the discharge ports being located radially outside of the periphery of bearing hole 11a and located on opposite sides of the axis of bearing hole 11a. The suction port 21 is formed as a generally arcuate groove upon being cut out and opened to a suction region in which the internal volume of each pump chamber 20 increases with the pumping action of the above-mentioned pump element. The discharge port 22 is formed as a generally arcuate groove upon being cut out and opened to a discharge region in which the internal volume of each pump chamber 20 decreases with the pumping action of the above-mentioned pump element.

Figure 8:
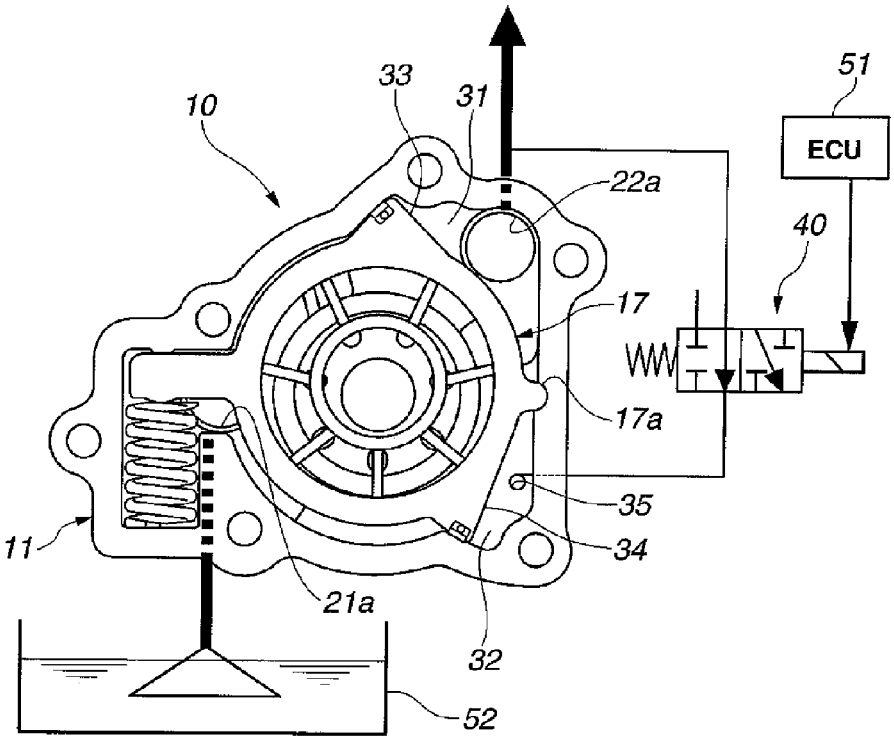
FIG. 8 is a diagram of a hydraulic circuit including the variable displacement oil pump of FIG. 1.

Suction port 21 is connected at its central position to introduction passage 24 formed extending to the side of spring accommodating chamber 28. Suction hole 21a is located in the introduction passage 24 and formed passing through the bottom wall of pump body 11 and opened to the outside. By this, as shown in FIG. 8, lubricating oil stored in oil pan 52 of the engine is sucked into each pump chamber 20 within the above-mentioned suction region through suction hole 21a and suction port 21 under a suction developed by the pumping action of the above-mentioned pump element. Suction hole 21a is configured together with suction passage 24 to abut on a region outside the outer peripheral surface of cam ring 17 at a pump suction side, thereby introducing a suction pressure into the outer peripheral surface outside region of the cam ring. By this, since the outer peripheral surface outside region of cam ring 17 at the pump suction side adjacent each pump chamber 20 in suction region takes a suction pressure or atmospheric pressure, leak of lubricating oil from each pump chamber 20 to the outer peripheral surface outside region of the cam ring at the pump suction side can be suppressed. Here, the "pump suction side" means a left-side region of a flat plane N (referred hereafter to as "cam ring eccentrically movable direction plane") which is perpendicular to plane M as shown in FIG. 2.

Discharge port 22 is connected at its one or lower end portion to introduction passage 25 extending to abut on first pressure chamber 31 (discussed after) which is defined outside the outer peripheral surface of cam ring 17. The other or upper end portion of discharge port 22 is formed with discharge hole 22a which pierces the bottom wall of the pump body 11 and opened to the outside of the pump body 11. This discharge hole 22a is communicated with various sliding sections within the engine and with a valve timing control system though not shown. With such an arrangement, lubricating oil discharged from each pump chamber 20 upon being pressurized under the pumping action of the above-mentioned pump element is supplied to the various sliding sections within the engine and to the valve timing control system through the discharge port 22 and the discharge hole 22a. Discharge hole 22a is configured together with introduction passage 25 to abut on a region outside the outer peripheral surface of cam ring 17 at a pump discharge side, so that a discharge pressure is introduced to the outer peripheral surface outside region of cam ring 17 at the pump discharge side. Here, the above-mentioned "pump discharge side" means a right-side region of the cam ring eccentrically movable direction plane N in FIG. 2.

Further, communication groove 23 is formed as a cutout near the lower end portion of discharge port 22 to allow discharge port 22 to be communicated with the bearing hole 11a, so that lubricating oil is supplied through the communication groove 23 to bearing hole 11a and additionally to side sections of rotor 15 and banes 16 thereby securing a lubrication to various sliding sections. Communication groove 23 is formed extending in a direction which does not agree to a direction in which each vane 16 is projectable from and retractable in the slit, so that the vane can be prevented from getting off from its position to the communication groove when the vane makes its projection from and retraction in the slit.

Cover member 12 is generally plate-shaped and formed slightly thicker at its portion corresponding to bearing hole 11a of pump body 11 which portion is located at its outer side surface, than other portions thereof. Bearing hole 12a is formed piercing the thicker portion in order to rotatably support the other end section of drive shaft 14. While the inner side surface of cover member 12 has been shown and described as being formed flat in this embodiment, it will be understood that suction and discharge ports 21, 22 may be formed at the inner side surface of the cover member similarly to at the bottom surface of pump body 11. Additionally, it will be understood that a groove for introducing lubricating oil to bearing hole 12a may be formed at the inner side surface of cover member like communication groove 23. This cover member 12 is installed to the surface of the open end of pump body 11 with a plurality of bolts 26.

Drive shaft 14 is configured to rotate rotor 15 clockwise in FIG. 2 under the rotational force transmitted from the crankshaft. The left half side of cam ring eccentrically movable direction plane N perpendicular to flat plane M at the center axis of drive shaft 14 is the above-mentioned pump suction side, while the right half side of cam ring eccentrically movable direction plane is the above-mentioned pump discharge side.

As shown in FIGS. 1 and 2, rotor 15 is formed with slits 15a as cutouts which slits radially outward extend from its radially inner central side to its radially outer peripheral side. Each slit 15a is formed at its base end or radially inward portion with a back pressure chamber 15b which is generally circular in cross-section and supplied with lubricating oil discharged to discharge port 22. By this, each vane 16 is pushed radially outward under the centrifugal force with rotation of rotor 15 and the oil pressure within back pressure chamber 15b.

Each vane 16 is slidably contacted at its tip end surface with the inner peripheral surface of cam ring 17 and has the base end or radially inward portion whose side surfaces are respectively slidably contacted with the sliding surfaces of ring members 19, 19. By this, even when the engine speed of the engine is low so that the above-mentioned centrifugal force and the oil pressure within back pressure chamber 15b are low, pump chamber 20 can be defined to maintain a secure liquid sealing with the outer peripheral surface of rotor 15, the respective inside surfaces of adjacent vanes 16, 16, the inner surface of cam ring 17, bottom surface 13a of pump accommodating chamber 13 of pump body 11 serving as a side wall, and the inside surface of cover member 12 serving as another side wall.

Cam ring 17 is formed of a so-called sintered metal and formed generally cylindrical as a single piece. Cam ring 17 is provided with a pivot section or swinging movement fulcrum 17a which is formed at a certain position in its outer peripheral section and projects radially outwardly from the outer peripheral surface thereof. Pivot section 17a is generally semicylindrical and axially extends so as to be fitted in support groove 11b of pump body 11 constituting a support point for eccentric movement of the cam ring. Arm section 17b is formed projecting from a position of the cam ring 17 which position is located generally on an opposite side of the center axis of cam ring 17 with respect to pivot section 17a so as to be in cooperation with spring 18.

Here, pump body 11 is formed thereinside with a spring accommodating chamber 28 which is located on an opposite side of the center axis of the pump body with respect to support groove 11b and communicated with pump accommodating chamber 13 through communication section 27 having a certain width L. Spring 18 is accommodated within this spring accommodating chamber 28. This spring 18 is springingly maintained between the tip end section of arm section 17b extending through communication section 27 to spring accommodating chamber 28 and the bottom surface of the spring accommodating chamber 28 with a certain set load W. Arm section 17b is provided at the bottom surface of its tip end section with support projection 17i which is formed generally semispherical and engaged with the inner peripheral side of spring 18, so that one end of spring 18 is supported by support projection 17i.

With this arrangement, spring 18 is configured to always bias cam ring 17 through arm section 17b in a direction (clockwise in FIG. 2) to increase the eccentricity amount of the cam ring under the biasing force based on the above-mentioned set load W. By this, in an inoperative condition of cam ring 17 as shown in FIG. 2, cam ring 17 is in a state where the upper surface of the arm section 17a is brought into contact with stopper portion 28a projected from the upper wall of spring accommodating chamber 28 with the biasing force of spring 18, so that cam ring 17 is put into a position at which the eccentricity amount is the maximum. As discussed, arm section 17b is formed extending on the opposite side to pivot section 17a thereby configuring such that the tip end portion of arm section 17 is biased by spring 18, so that the maximum toque is applied to cam ring 17. This achieves making spring 18 small-sized, thereby small-sizing the pump itself.

Cam ring 17 are provided at its outer peripheral section with first and second seal constituting sections 17c, 17d which are generally triangular in cross-section and project radially outward. First and second seal constituting sections 17c, 17d are respectively formed with first and second seal surfaces 17g, 17h which are respectively coaxial with and face first and second seal sliding surfaces 11c, 11d. Each surface 17c, 17d, 17g, 17h forms part of a cylindrical surface which is arcuate in cross-section. Seal constituting sections 17c, 17d are respectively formed at their seal surfaces 17g, 17h with first and second seal supporting grooves 17e, 17f which are formed axially extending as cutouts, each seal supporting groove having a generally rectangular cross-section. Seal members 30, 30 are respectively maintained in seal supporting grooves 17e, 17f so as to come into contact with seal sliding surfaces 11c, 11d when cam ring 17 makes its eccentrically swingable movement.

Here, seal surfaces 17g, 17h respectively form parts of cylinders which respectively have certain radiuses R3, R4 which are respectively slightly smaller than radiuses R1, R2 with which the corresponding seal sliding surfaces 11c, 11d are respectively configured as shown in FIGS. 3 and 5, in which each radius R3, R4 is from the center axis of pivot section 17a which center axis corresponds to the center axis A of the support groove 11b. Small clearance C is formed between each seal surface 17g, 17h and each seal sliding surface 11c, 11d as shown in FIG. 2.

Each seal member 30, 30 is formed, for example, of a fluororesin or fluorine-containing resin having a low friction characteristics and linearly extends in an axial direction of cam ring 17. Seal members 30, 30 are respectively configured to be biased against seal sliding surfaces 11c, 11d under the elastic force of elastic members 29, 29 formed of rubber or elastomeric material which elastic members are respectively disposed in the bottom sections of seal supporting grooves 17e, 17f. This always maintains a good fluid-tight sealing for pressure chambers 31, 32 as discussed below.

In the inoperative condition of cam ring 17, first pressure chamber 31 and second pressure chamber 32 are formed outside the outer peripheral surface of cam ring 17 and located within a side (or the pump discharge side) including pivot section 17a relative to the cam ring eccentrically movable direction plane N. First and second pressure chambers 31, 32 are respectively located on opposite sides of pivot section 17a, in which each pressure chamber 31, 32 is defined between the outer peripheral surface of cam ring 17 and the inner peripheral surface of pump body 11, and more specifically defined with the outer peripheral surface of cam ring 17, pivot section 17a, each seal member 30 and the inner peripheral surface of pump body 11. While whole first and second pressure chambers 31, 32 are shown and described as being located within the above-mentioned pump discharge side in the region outside the outer peripheral surface of cam ring 17 in this embodiment, it will be understood that first and second pressure chambers 31, 32 are preferably located within a region overlapping with the above-mentioned discharge region which serves as a pressurizing region in a radial direction of the pump, i.e., within a region on an opposite side of the cylindrical wall of cam ring 17 with respect to pump chamber 20 which is always at a positive pressure.

A discharge pressure fed to discharge port 22 is always introduced through introduction passage 25 to first pressure chamber 31, so that the discharge pressure acts on first pressure receiving surface 33 which is constituted by a part of the outer peripheral surface of cam ring 17 which surface abuts on first pressure chamber 31, the first pressure receiving surface being configured to receive a force against the bias of spring 18. By this, cam ring 17 is supplied with a swinging force (moving force) in a direction (or counter-clockwise in FIG. 2) to decrease the eccentricity amount of the cam ring. In other words, a pressure in first pressure chamber 31 always biases cam ring 17 in such a direction that the center axis of cam ring 17 approaches the center axis of rotor 15, i.e., in a direction toward a coaxial relationship with rotor 15, thus accomplishing a control for the moving amount of cam ring 17 in a direction toward the coaxial relationship with rotor 15.

The discharge pressure is suitably introduced into second pressure chamber 32 through introduction hole 35 formed piercing the bottom wall of pump body 11, the introduction hole is connected to discharge hole 22a through solenoid valve 40 which will be discussed below and is controlled in accordance with engine operating conditions. The discharge pressure introduced into second pressure chamber 32 acts on second pressure receiving surface 34 which is constituted by a part of the outer peripheral surface of cam ring 17 which surface abuts on second pressure chamber 32, the second pressure receiving surface being configured to receive a force for assisting the biasing force of spring 18. By this, cam ring 17 is supplied with a swinging force (moving force) in a direction (or clockwise in FIG. 2) to increase the eccentricity amount of the cam ring.

Here, as shown in FIG. 2, a pressure receiving area S2 of second pressure receiving surface 34 is set smaller than a pressure receiving area S1 of first pressure receiving surface 33, so that the biasing force in an eccentrically movable direction of cam ring 17 based on the internal pressure in second pressure chamber 32 and the biasing force of spring 18 can be balanced under a certain force relationship. In other words, in second pressure chamber 32, the discharge pressure supplied through solenoid valve 40 when required acts on second pressure receiving surface 34 thereby assisting the biasing force of spring 18, thus accomplishing a control for the moving amount of cam ring 17 in the eccentrically movable direction.

As shown in FIG. 8, oil pump 10 is separately provided with solenoid valve 40 which is operated in accordance with engine operating conditions of the engine under the action of energizing current from an ECU 51 mounted on a vehicle equipped with the engine. Discharge hole 22a and introduction hole 35 are connected to each other through this solenoid valve 40, so that first pressure chamber 31 and second pressure chamber 32 are brought into communication with each other when solenoid valve 40 is opened.

Figure 6:
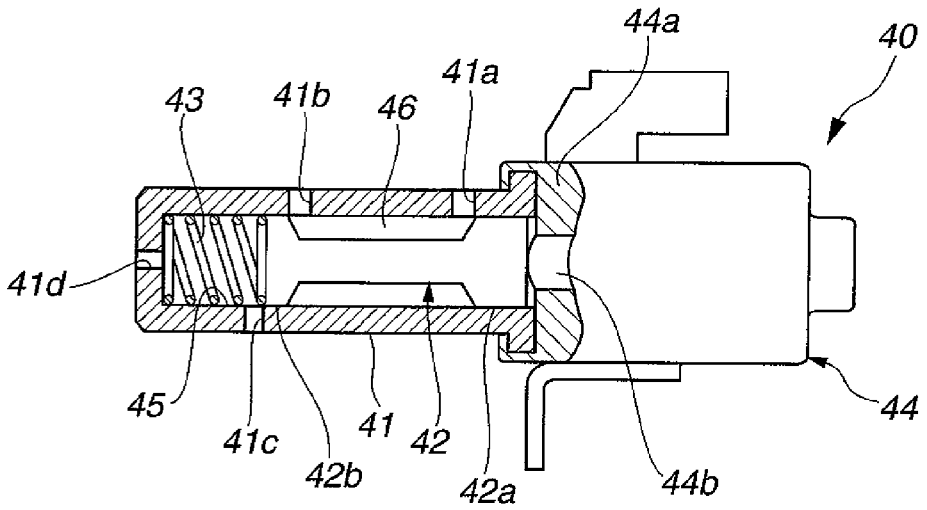
FIG. 6 is a vertical sectional view of a solenoid valve used in the variable displacement oil pump of FIG. 1, showing a state where no current is supplied to the solenoid valve.
Figure 7:
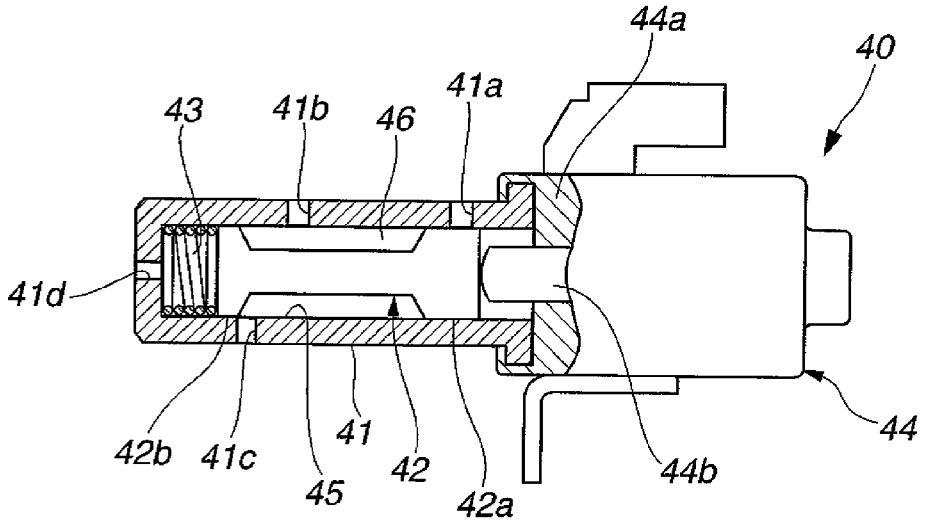
FIG. 7 is a vertical sectional view similar to FIG. 6 but showing a state where current is supplied to the solenoid valve.

As shown in FIGS. 6 and 7, solenoid valve 40 includes valve body 41 which is opened at its one end and closed at the other end. Valve member 42 is axially slidably disposed inside valve body 40 and provided at its opposite end portions with first and second land portions 42a, 42b which are in slidable contact with the inner peripheral surface of valve body 41. Back pressure chamber 45 is defined at the side of the closed end of valve body 41 by second land portion 42b of valve member 42. Spring 43 is disposed in back pressure chamber 45 to bias valve member 42 toward the open end of valve body 41. Electromagnetic unit 44 is installed to the open end of valve body 41 and arranged to cause rod 44b to project upon supplying electric current or energizing current, thereby axially moving valve member 42 toward the closed end of valve body 41 against the biasing force of spring 34.

Valve body 41 is formed with IN port 41a connected to discharge hole 22a and OUT port 41b connected to introduction hole 35, the ports being formed piercing the peripheral wall of valve body 41. Drain port 41c is formed piercing the peripheral wall of valve body 41 to connect the inside of the valve body to suction port 21 or the outside of the valve body. Additionally, back pressure port 41d is formed piercing the wall of the closed end of valve body 41 to be always opened to back pressure chamber 45 and to be connected to suction port 21 or the outside of the valve body.

Valve member 42 has an intermediate section which is reduced in diameter thereby defining an annular space 46 between two land portions 42a, 42b and by the inner peripheral surface of valve body 41, so that OUT port 41b is communicable with IN port 41b or with drain port 41c through this annular space 46.

Electromagnetic unit 44 is configured as being known and includes a coil unit 44a in which a bobbin is wound with a coil and fitted inside a yoke though not shown. An armature (not shown) formed of a magnetic material is axially projectably and retractably disposed inside coil unit 44a. The armature is connected to rod 44b, so that the rod is axially movable to project or retract with movement of the armature in accordance with current supply conditions to coil unit 44a.

Here, solenoid valve 40 is of a so-called normally opened type as shown in FIG. 6 and therefore IN port 41a and OUT port 41b are communicated with each other through annular space 56 in a non-current supply condition where no current is supplied to coil unit 44a, so that the discharge pressure is introduced into second pressure chamber 32 (a first condition according to the present invention). At this time, drain port 41c is kept in a state to be opened to back pressure chamber 45.

In contrast, when the energizing current is supplied to coil unit 44a as shown in FIG. 7, valve member 42 is pushed back toward the closed end of valve body 41 against the biasing force of spring 43 under the pushing force of rod 44b. By this, IN port 41a is closed with first land portion 42a of valve body 42 while OUT port 41b is communicated with drain port 41c through annular space 46, so that second pressure chamber 32 is released to be supplied with the suction pressure or atmospheric pressure (a second condition according to the present invention).

With the above arrangement, in oil pump 10, the eccentricity amount of cam ring 17 is controlled by regulating a force relationship applied to cam ring 17, i.e., the force relationship between the internal pressure of first pressure chamber 31 and the sum of the biasing force of spring 18 and the internal pressure of second pressure chamber 32 regulated by solenoid valve 40. This eccentricity amount control regulates a variation in internal volume of each pump chamber 20 during operation of the oil pump 10, thereby controlling a discharge pressure characteristics of the oil pump 10.

Hereinafter, featured operations of oil pump 10 according to the present invention, i.e., the discharge pressure control of the pump based on the eccentricity amount control of cam ring 17 will be discussed with reference to FIGS. 2, 3 and 9.

First, the discharge pressure of oil pump 10 is decided by a required oil pressure in various sliding sections of the engine and the valve timing control system. Since the required oil pressure in the engine varies according to the engine operating conditions of the engine, there are a variety of required pressure whose typical one is shown in a map of FIG. 9. Specifically, in case that the valve timing control system is used, for example, for the purpose of improving fuel economy and the like, the required oil pressure takes a value P1. Additionally, the required oil pressure for the internal combustion engine is decided mainly by an oil pressure required in a bearing section of a crankshaft, in which this required oil pressure varies in accordance with engine speed, engine load (throttle valve opening degree), oil temperature and the like. For example, during a low load and low engine oil temperature engine operation, the required oil pressure takes a value P2 in FIG. 9, whereas during a high load and high engine oil temperature engine operation, the required oil pressure takes a value P4 in FIG. 9. Further, during a high load engine operation, it is required to use oil jet for cooling pistons, and therefore an oil pressure P3 is required at a certain engine speed n in FIG. 9 during a medium engine speed engine operation.

Figure 9:
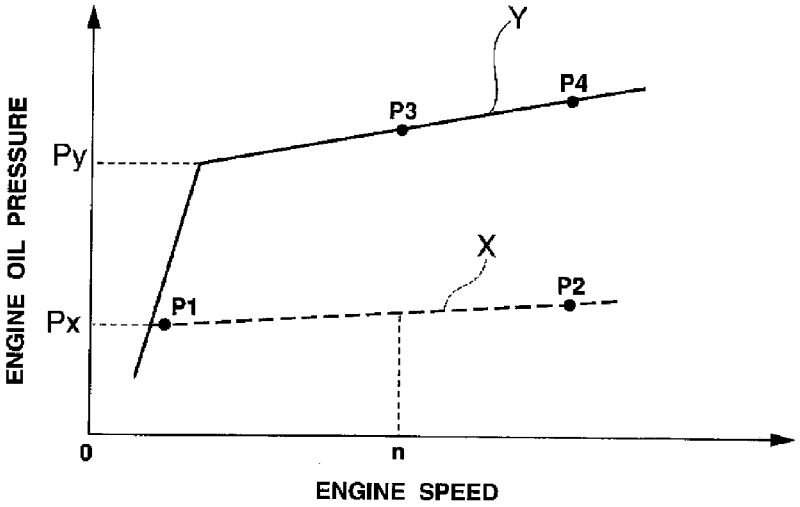
FIG. 9 is a graph showing the relationship between engine oil pressure and engine speed of an internal combustion engine on which the variable displacement oil pump of FIG. 1 is mounted.

Accordingly, oil pump 10 is set to take a low pressure characteristics X (first discharge pressure characteristics) meeting the required oil pressure represented by either one of P1 and P2 or the required oil pressures represented by both P1 and P2 in FIG. 9 during a low load or low engine oil temperature engine operation, and to take a high pressure characteristics Y (second discharge pressure characteristics) meeting the required oil pressure represented by either one of P3 and P4 or the required oil pressures represented by both P3 and P4. By changing over ON and OFF of solenoid valve 40, the operational characteristics of cam ring 17, i.e., first and second operational oil pressures Px, Py (in FIG. 9) which are discharge pressures required for operation of cam ring 17 are changed so as to select the optimum one of both oil pressure characteristics X, Y thereby meeting the various required oil pressures in the engine.

In this embodiment, as illustrated in FIG. 9, the low pressure characteristics X is set at an oil pressure characteristics indicated by a broken line connecting the required oil pressure P1 for a variable valve timing control system and the required oil pressure P2 during a high engine speed engine operation under a low load or low engine oil temperature condition, whereas the high pressure characteristics Y is set at an oil pressure characteristics indicated by a solid line connecting the required oil pressure P3 during an intermediate engine speed engine operation under a high load or high engine oil temperature condition and the required oil pressure P4 during a high engine speed engine operation under the same condition.

More specifically, in oil pump 10, the set load W of spring 18 is set at a value corresponding to first operational oil pressure Px. Accordingly, during the low load and low engine oil temperature engine operation, the energizing current is supplied from ECU 51 to solenoid valve 40, and therefore IN port 41a is closed so that the discharge pressure is introduced only into first pressure chamber 31. By this, cam ring 17 is maintained in a state having the maximum eccentricity amount until the internal pressure of first pressure chamber 31 reaches first operational oil pressure Px as shown in FIG. 2, so that the discharge pressure abruptly rises with an increase in engine speed of the engine. Then, when the internal pressure of first pressure chamber 31 reaches first operational oil pressure Px under the rise of the discharge pressure, cam ring 17 makes its swingable movement around pivot section 17a serving as the fulcrum, in a direction to decrease the eccentricity amount of cam ring 17, i.e., downward along the cam ring eccentrically movable plane N, as shown in FIG. 3. By this, a volume variation of each pump chamber 20 is decreased during operation of the pump. As a result, a rise in discharge pressure with rise in engine speed becomes gentle, so that low pressure characteristics X as shown in FIG. 9 can be obtained.

When the engine operation is shifted from the low load or low engine oil temperature condition to the high load or high engine oil temperature condition, supply of the energizing current to solenoid valve 40 from ECU 51 is interrupted so that IN port 41a and OUT port 41b are brought into communication with each other, thereby introducing the discharge pressure not only into first pressure chamber 31 but also in second pressure chamber 32. Then, a pressure acting on second pressure receiving surface 34 of second pressure chamber 32 works to assist the biasing force of spring 18. Consequently, cam ring 17 cannot be operated even when the internal pressure of first pressure chamber 31 reaches first operational oil pressure Px in FIG. 9, so that cam ring 17 is kept in the state having the maximum eccentricity amount until the difference between the hydraulic pressure applied to first pressure receiving surface 33 with the internal pressure of first pressure chamber 31 and the hydraulic pressure applied to second pressure receiving surface 34 with the internal pressure of second pressure chamber 32 reaches the biasing force of spring 18, as shown in FIG. 2. More specifically, during the high load or high engine oil temperature engine operation, as shown in FIG. 9, until the discharge pressure reaches second operational oil pressure Py at which the difference between the hydraulic pressure applied to first pressure receiving surface 33 with the internal pressure of first pressure chamber 31 and the hydraulic pressure applied to second pressure receiving surface 34 with the internal pressure of second pressure chamber 32 becomes equal to the biasing force of spring 18, cam ring 17 is kept at the state having the maximum eccentricity amount, so that the discharge pressure largely rises with an increase in engine speed of the engine. Then, when the internal pressure of first pressure chamber reaches second operational oil pressure Py, cam ring 17 makes its swingable movement in a direction to decrease the eccentricity amount of cam ring 17 as shown in FIG. 3. By this, the volume variation in each pump chamber 20 during operation of the pump is decreased so that a rise of the discharge pressure with an increase in engine speed becomes gentle, thereby obtaining high pressure characteristics Y as shown in FIG. 9.

Thus, in oil pump 10, the pump discharge characteristics is basically shifted to high pressure characteristics Y when ECU 51 makes its decision to require a high pressure in accordance with engine speed, engine load, engine oil temperature and the like. Normally, shifting to high pressure characteristics Y is made when the engine load, engine oil temperature and the like are high, and therefore high pressure characteristics Y has been shown and described as being exhibited in a condition where the engine load and the engine oil temperature are high, as an example. However, for example, there is a case requiring an oil pressure higher than the above required oil pressure P1 even in the valve timing control system. In such a case, the charge-over action of solenoid valve 40 is made in accordance with operational signals of the valve timing control system, so that the pump discharge pressure characteristics is shifted to high pressure characteristics Y even in a condition where the engine load, the engine oil temperature and the like are low. In other words, while required oil pressure P1 has been shown and described as being set at a normal required oil pressure for the valve timing control system, it will be understood that required oil pressure P1 may be set as the lowest required oil pressure for the valve timing control system, according to the specifications of a vehicle on which the engine including oil pump 10 is mounted.

When shifting is again made from the high load or high oil temperature condition to the low load or low engine oil temperature condition, the energizing current is again supplied from ECU 51 to solenoid valve 40 so that the solenoid valve is put into its energized state as shown in FIG. 7 in which second pressure chamber 32 is released to be supplied with the atmospheric pressure or suction pressure. By this, operation of cam ring 17 depends on the force relationship between the internal pressure of first pressure chamber 31 and the biasing force of spring 18, so that the discharge pressure characteristics of the pump is shifted to low pressure characteristics X. As a result, the discharge pressure is lowered by an amount corresponding to a discharge pressure which becomes unnecessary upon shifting to the low engine load or low engine oil temperature condition, thereby suppressing a power loss of the engine.

As discussed above, in oil pump 10, the operational characteristics of cam ring 17 can be changed by changing over the operation of solenoid valve 40 in accordance with various engine operating information such as the engine speed, engine load, the engine oil temperature and the like by ECU 51, thereby selecting the discharge pressure characteristics of the pump, suitable for the engine speed, the engine oil temperature and the like. This makes it possible to suppress a power loss of the engine at the minimum value.

Additionally, oil pump 10 does not require a complicated control such as a duty cycle control or the like for the operational control of cam ring 17, because it accomplishes the operational control of cam ring 17 by a simple control or ON-OFF control of solenoid valve 40. Further, such an operational control of cam ring 17 can be accomplished without requiring a high-precision machining for the ports and the like of solenoid valve 40 and a tuning of valve opening characteristics, and accordingly can be easily accomplished by using a usual solenoid valve having a simple structure. This achieves a production cost reduction for the oil pump.

Further, in oil pump 10, the internal pressure of each pump chamber 20 in the discharge region acts on the inner peripheral surface of cam ring 17 around pivot section 17a as indicated by fat dark arrows in FIG. 3, so that cam ring 17 is pushed to the right side along the cam ring standard plane M, i.e., toward the side of support groove 11b thereby pushing pivot section 17a into support groove 11b. However, in case of oil pump 10 of this embodiment, the internal pressures of both pressure chambers 31, 32 act to push back cam ring 17 in an opposite direction as indicated by fat dotted arrows in FIG. 3 because both pressure chambers 31, 33 are located at the region outside the outer peripheral surface of cam ring 17 in the pump discharge side, i.e., on an opposite side of the peripheral or cylindrical wall of cam ring 17 with respect to each pump chamber 20. As a result, a pressure of pivot section 17a to support groove 11b can be lightened thereby reducing a friction between pivot section 17a and support groove 11b during the eccentric movement of cam ring 17. This makes it possible to suppress a wear of pivot section 17b and support groove 11b, particularly of support groove 11b of pump body 11 which is formed of a material low in hardness as compared with the material of cam ring 17, thereby improving a durability of the oil pump.

Under such an operation, forces acting on the inside and outside of cam ring 17 at the pump discharge side nearly offset each other; however, the atmospheric pressure or suction pressure acts on a region outside the outer peripheral surface of cam ring 17 which region is located on an opposite side of cam ring eccentrically movable direction plane N with respect to support groove 11b, so that pivot section 17a is slightly pushed into support groove 11b under the atmospheric pressure or suction pressure. As a result, there is no fear of pivot section 17a being separated from the inner surface of support groove 11b, thus obtaining a suitable operation of cam ring 17 under a suitable sliding contact between pivot section 17a and support groove 11b.

Furthermore, as discussed above, in the above-mentioned pump discharge side, both pressure chambers 31, 32 are located opposite to pump chambers 20 relating to the discharge region, and therefore a pressure acting on an inner peripheral side of cam ring 17 and a pressure acting on an outer peripheral side of cam ring 17 becomes the discharge pressure and nearly equal to each other. Accordingly, the pressure difference between the inner and outer peripheral sides of cam ring 17 can be suppressed at the minimum value in the discharge region. By this, it is made possible to suppress at the minimum value leak of lubricating oil through a small clearance between one side surface of cam ring 17 and bottom wall 13a of pump accommodating chamber 13 and through a small clearance between the other side surface of cam ring 17 and inner side surface of cover member 12. As a result, a loss of work of oil pump 10 can be sufficiently reduced, thereby obtaining a high efficiency of oil pump 10.

Thus, according to oil pump 10 of the present invention, first and second pressure chambers 31, 32 are located on the opposite sides of pivot section 17a, and therefore the internal pressure of second pressure chamber 32 acts to assist the biasing force of spring 18, thereby making it possible to set the biasing force of spring 18 as small as possible. More specifically, with such a location of second pressure chamber 32, spring 18 is sufficient to have a biasing force for securing low pressure characteristics X, i.e., a biasing force balanced with first operational oil pressure Px, so that a low load spring lower in spring constant than a conventional spring can be used as spring 18. By this, a space required for spring 18 can be small-sized in pump body 11, thereby achieving making oil pump 10 small-sized and lightened in weight. As a result, a mounting ability of oil pump on the engine can be improved.

Additionally, second pressure receiving surface 34 is set to be smaller in pressure receiving area than first pressure receiving surface 33, and therefore the operational oil pressure for cam ring 17 can be set at two stages under the action of second pressure chamber 32. By this, freedom of the discharge pressure characteristics of the oil pump can be improved.

Further, a variety of conventional pumps have been heretofore provided as a pump configured such that a cam ring is swingably movably controlled under the pressure difference between two pressure chambers, such as a variable displacement pump for a power steering system or the like. Any of these conventional pumps has a structure in which a pressure difference is developed based on a pressure loss under the action of an orifice or the like, in which this pressure loss lowers a pump efficiency. In contrast, in oil pump 10 of the present invention, the discharge pressure is introduced into first and second pressure chambers 31, 32 without a pressure loss, in which an operational torque for cam ring 17 is developed by the difference in pressure receiving area between pressure chambers 31, 32, i.e., the difference in area between first and second pressure receiving surfaces 33, 34. Accordingly, oil pump 10 of the present invention has no fear of causing a pump efficiency to be lowered like the above-mentioned conventional pumps. By this, oil pump 10 of the present invention can be improved in pump efficiency by an amount corresponding to the pressure loss being not developed, as compared with the above-mentioned conventional variable displacement pumps.

Further, oil pump 10 of this embodiment is set to take the high pressure characteristics when solenoid valve 40 is not supplied with the energizing current, and therefore a required discharge pressure can be secured even when solenoid valve 40 is failed, thus being providing with a function as a fail-safe.

Figure 10:
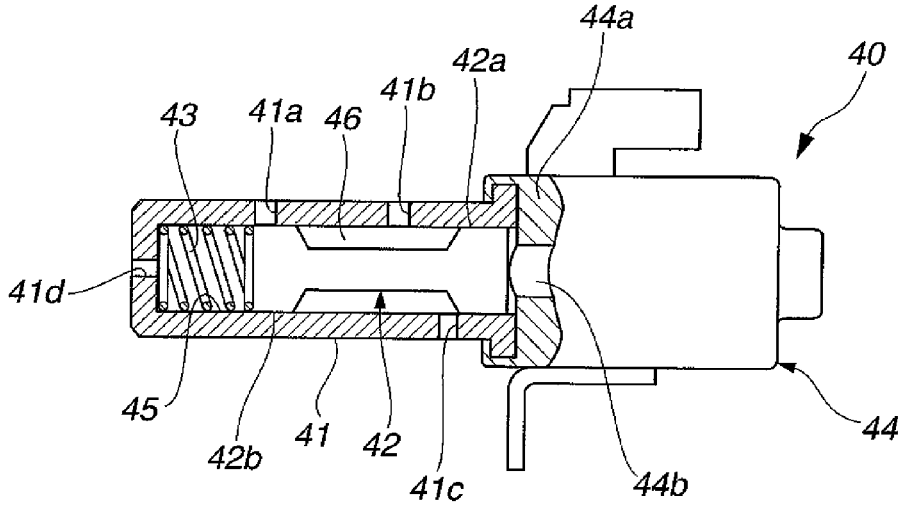
FIG. 10 is a vertical sectional view of a solenoid valve forming part of a modified example of the first embodiment of the variable displacement oil pump of FIG. 1, showing a state where no current is supplied to the solenoid valve.
Figure 11:
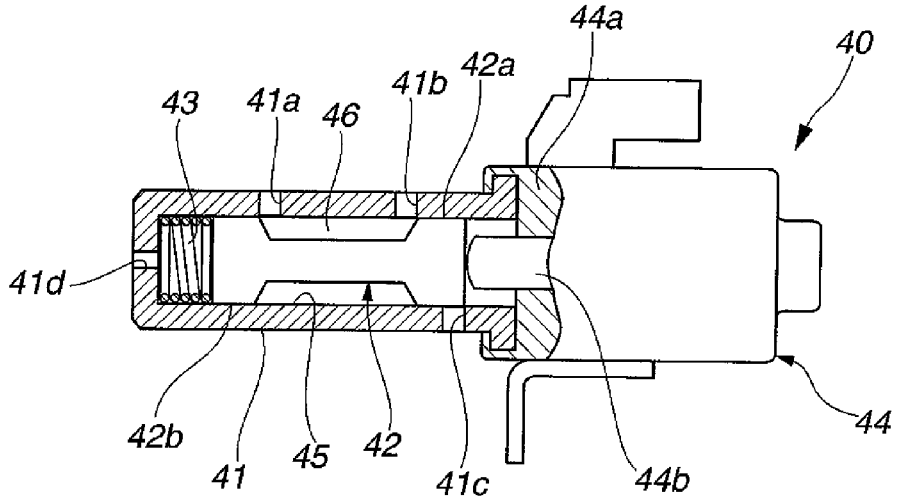
FIG. 11 is a vertical sectional view similar to FIG. 1, showing a state where current is supplied to the solenoid valve.
Figure 12:
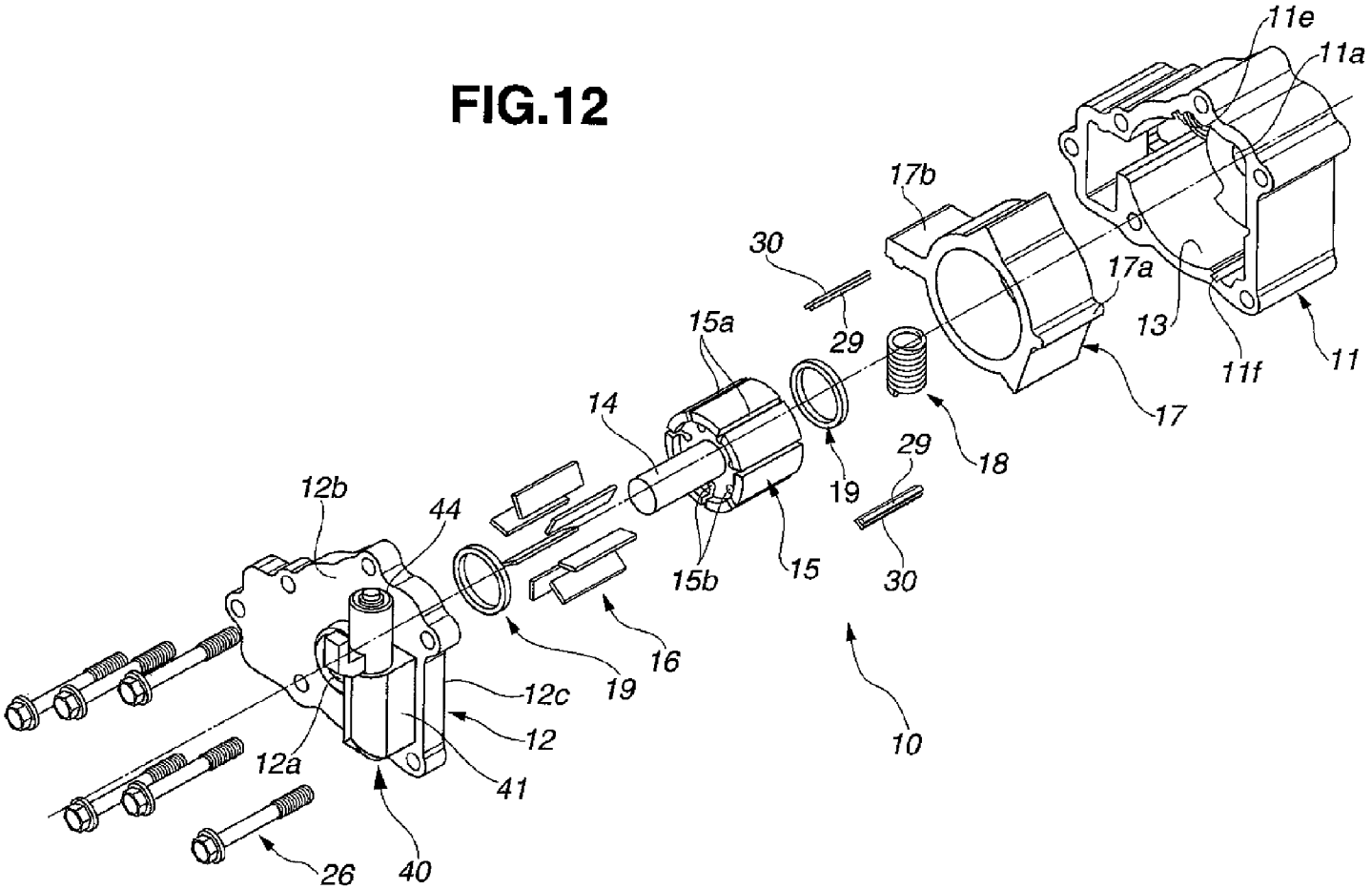
FIG. 12 is a perspective exploded view of a second embodiment of the variable displacement oil pump according to the present invention.
Figure 13:
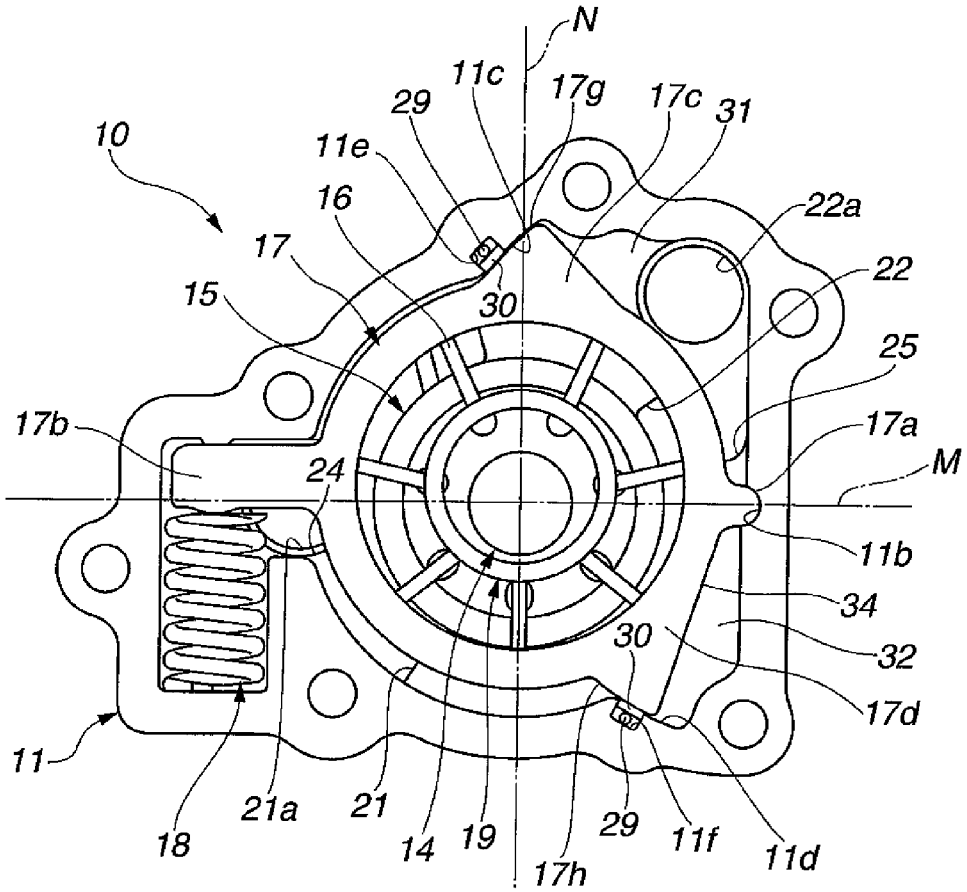
FIG. 13 is a front view of the variable displacement oil pump of FIG. 12 in a state where a cover member is removed, showing a condition where the eccentricity amount of a cam ring is the maximum.
Figure 14:
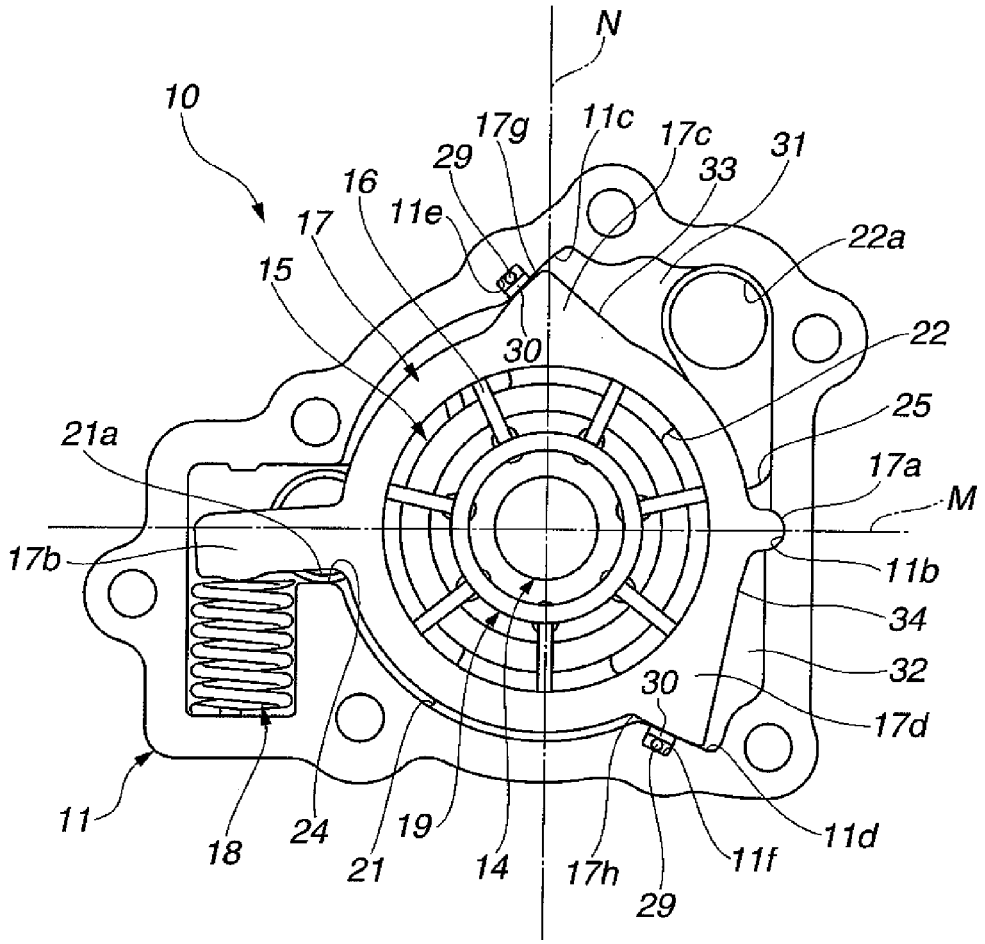
FIG. 14 is a front view similar to FIG. 13 but showing a condition where the eccentricity amount of the cam ring is the minimum.

FIGS. 10 and 11 illustrate a modified example of the first embodiment of oil pump 10 according to the present invention, which is similar to the first embodiment except for the structure of solenoid valve 40. Solenoid valve 40 of this modified example is configured to be of a so-called normally closed type.

Specifically, solenoid valve 40 of this modified example is configured to be of the so-called normally closed type having a reversed characteristics relative to that of the first embodiment. As shown in FIG. 10, in this oil solenoid valve 40, IN port 51a is closed while OUT port 51b is communicated with drain port 51c when no energizing current is supplied to the solenoid valve as shown in FIG. 10, whereas IN port 51a is communicated with OUT port 51b when the energizing current is supplied to the solenoid valve as shown in FIG. 11. By this, oil pump 10 takes low pressure characteristics X when no energizing current is supplied to solenoid valve 40 and high pressure characteristics Y when the energizing current is supplied to solenoid valve 40.

With such an arrangement, in case that a frequency for taking high pressure characteristics Y is lower than that for taking low pressure characteristics X regarding the discharge pressure characteristics of oil pump 10 required by the engine, it is possible to shorten a current supply time for solenoid valve 40, thereby suppressing the deterioration of solenoid valve upon time lapse.

FIGS. 12 to 16 illustrate a second embodiment of oil pump 10 according to the present invention, which is similar to the first embodiment with the exception that positions of seal members 30, 30 are changed while solenoid valve 40 is formed integral with the housing.

Specifically, in this embodiment, seal supporting grooves 17e, 17f formed in respective seal constituting sections 17c, 17d of cam ring 17 in the first embodiment are omitted, and seal supporting grooves 11e, 11f similar to seal supporting grooves 17e, 17f are respectively formed at positions in seal sliding surfaces 11c, 11d which positions are opposite to the omitted seal supporting grooves 17e, 17f, in place of the omitted seal supporting grooves 17e, 17f. Seal members 30, 30 are respectively accommodated and located together with the elastic members 29, 29 in seal supporting grooves 11e, 11f.

Figure 15:
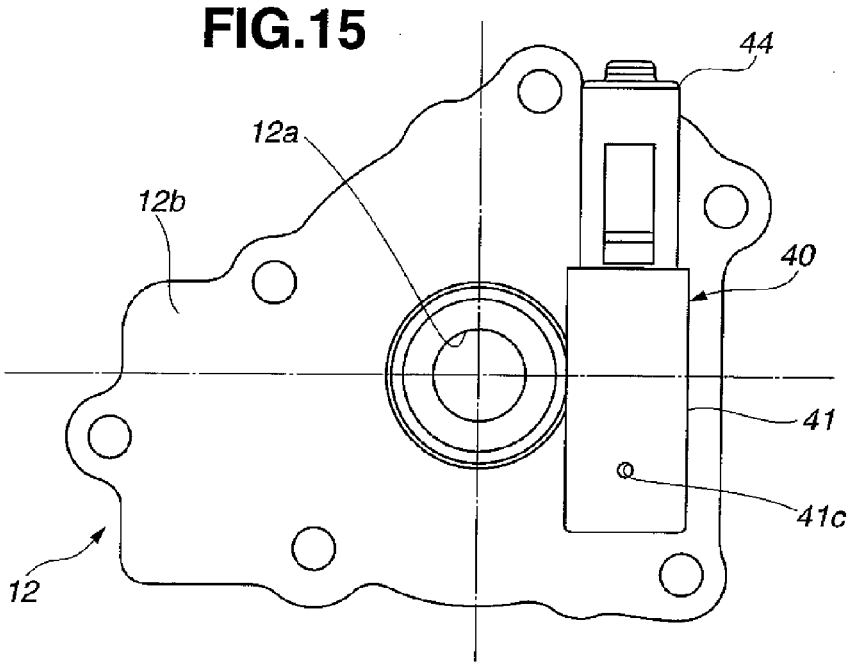
FIG. 15 is a front view of a cover member of a third embodiment of the variable displacement oil pump according to the present invention.
Figure 16:
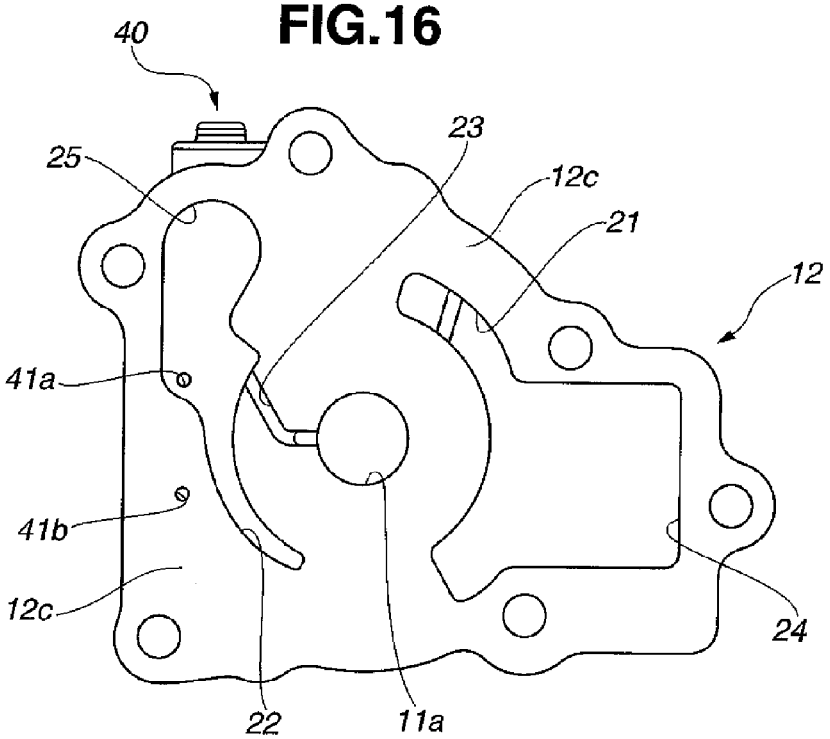
FIG. 16 is a back-side view of the cover member of FIG. 15.

Additionally, in this embodiment, as shown in FIGS. 15 and 16, valve body 41 of solenoid valve 40 is formed integral with cover member 12 and located at the outside surface of the cover member and extends parallel with cum ring eccentrically movable plane N, so that solenoid valve 40 is incorporated with the housing to form a single unit. The structure of solenoid valve 40 of this embedment is similar to that in the first embodiment, so that valve member 42 is slidably movably disposed inside valve body 41 formed integral with cover member 12 while electromagnetic unit 44 is installed to the open end of valve body 41 which open end is shown as an upper end in FIG. 5.

With such changes in arrangement, as shown in FIG. 16, cover member 12 is formed at its inside surface 12c with suction port 21, discharge port 22, communication groove 23 for communicating discharge port 22 and bearing hole 12a, and introduction passage 25 extending from discharge port 22, similarly to pump body 11.

Further, in this cover member 12, IN port 41a is formed piercing the wall of the cover member and located at a certain position in introduction passage 25 while OUT port 41b serving also as introduction hole 35 is formed piercing the wall of the cover member and located at a certain position which is generally symmetric with the position of IN port 41a with respect to cam ring standard plane M. Additionally, drain port 41c and back pressure port 41d are respectively formed piercing and located at certain positions of the peripheral wall and the bottom wall of valve body 11 which is formed integral with cover member 12.

Accordingly, with this embodiment, when cam ring 17 makes its eccentric movement, each seal member 30, 30 is brought into slidable contact with each seal surface 17g, 17h of cam ring 17 formed of a ferrous sintered material which is higher in hardness than pump body 11 formed of an aluminum alloy material, and therefore wear of an opposite member or pump body can be suppressed by each seal member 30, 30. By this, oil pump 10 of this embodiment can be improved in durability as compared with that of the first embodiment.

Furthermore, in this embodiment, solenoid valve 40 is formed integral with cover member 12, i.e., incorporated with the housing to form the single unit, so that a hydraulic circuit for oil pump 10 can be completed within this oil pump 10, thereby making small-sized an oil pressure supply system including oil pump 10.

Figure 17:
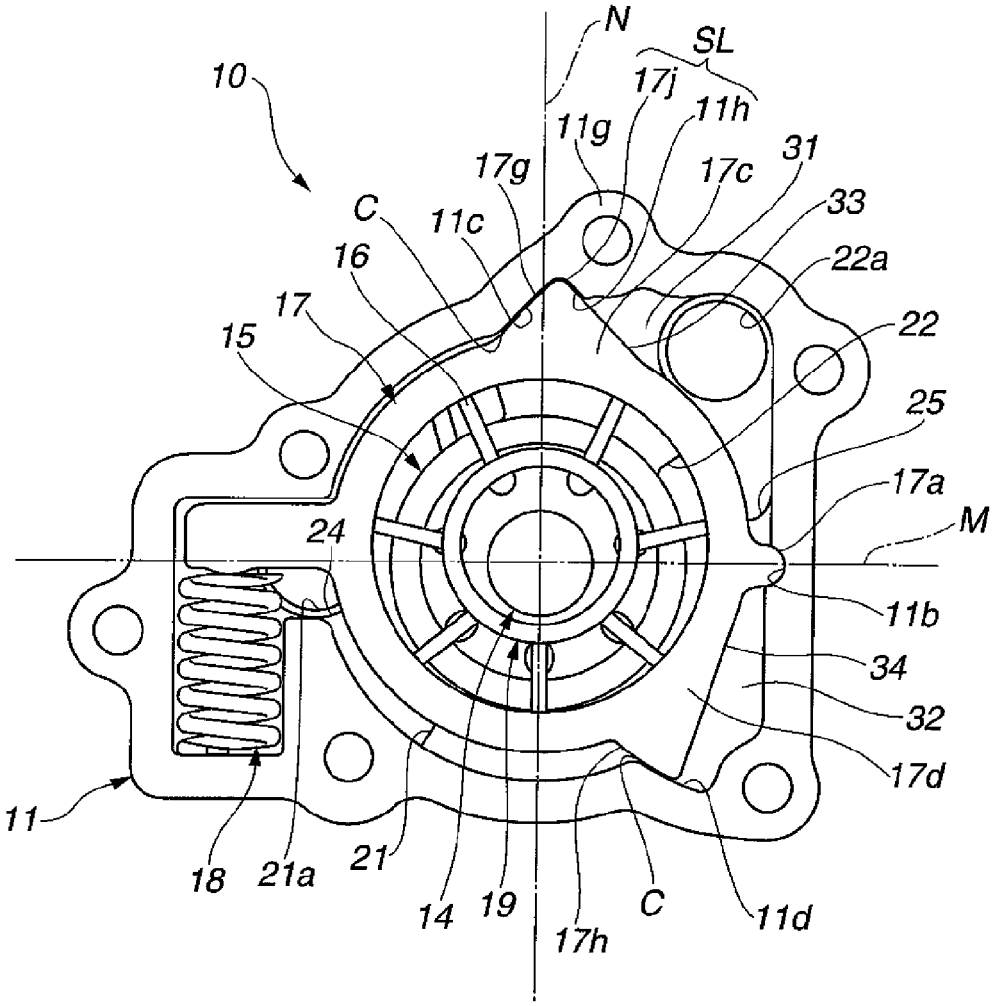
FIG. 17 is a front view of a fourth embodiment of the variable displacement oil pump according to the present invention, showing a state where a cover member is removed and showing a condition where the eccentricity amount of a cam ring is the maximum.
Figure 18:
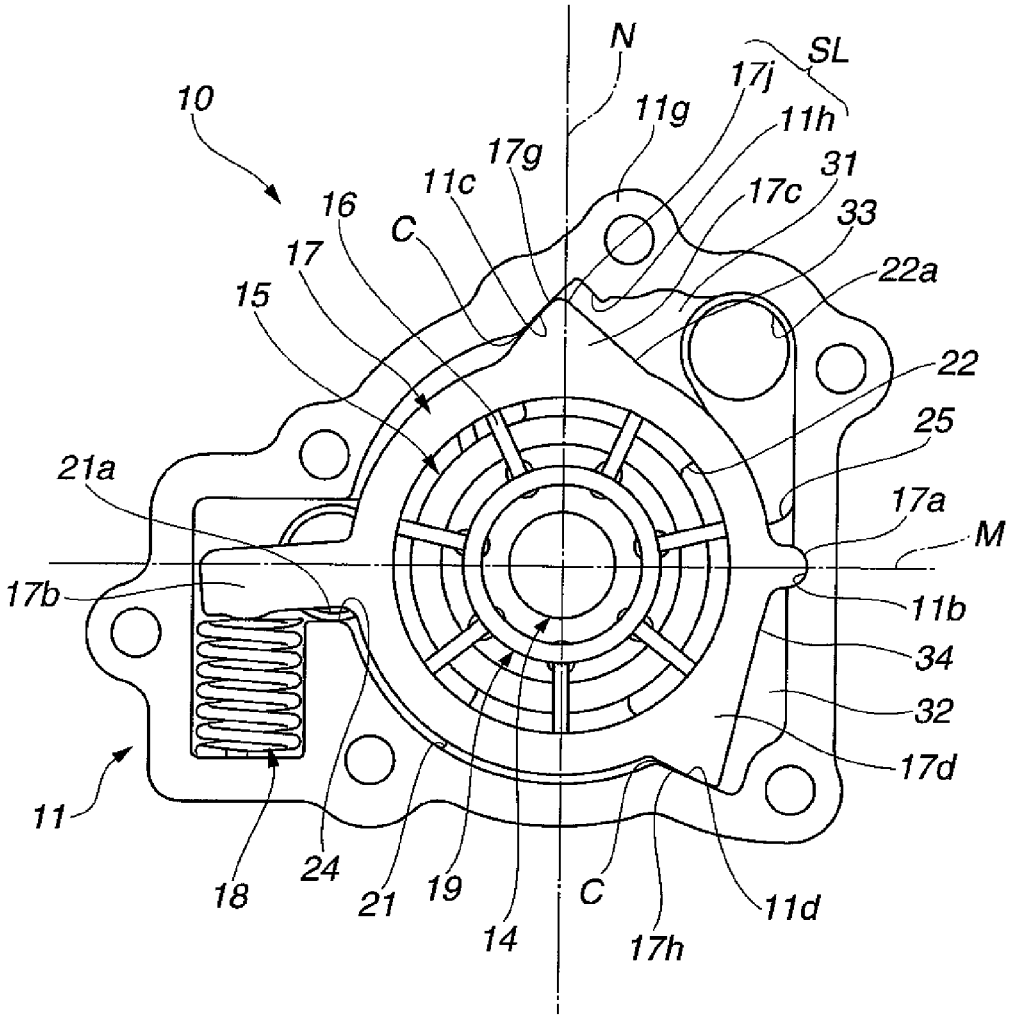
FIG. 18 is a front view similar to FIG. 17 but showing a condition where the eccentricity amount of the cam ring is the minimum.

FIGS. 17 and 18 illustrate a third embodiment of oil pump 10 according to the present invention, which is similar to the first embodiment. Accordingly, this oil pump 10 has basically the same structure as the oil pump of the first embodiment, omitting seal supporting grooves 17e, 17f formed respectively in seal constituting sections 17c, 17d of cam ring 17 in the first embodiment, and omitting elastic members 29, 29 and seal members 30, 30 accommodated in seal supporting grooves 17e, 17f in the first embodiment.

More specifically, in this embodiment, in place of the omitted seal members 30, 30 and the like, an inclined surface 17j of seal constituting section 17c of cam ring 17 is formed flat while seal constituting section 11h is formed at an inner peripheral section of pump body 11 which section is near bolt insertion section 11g into which bolt 26 is inserted. Seal constituting section 11h is formed facing inclined surface 17j of first seal constituting section 17c so as to be brought into contact with inclined surface 17j of the first seal constituting section 17c of cam ring 17 when cam ring 17 makes its maximum eccentric movement to form seal section SL.

This seal constituting section 11h is formed to be brought into tight contact with inclined surface 17j of first seal constituting section 17c of cam ring 17 when cam ring 17 makes its maximum eccentric movement, so that the inside of first pressure chamber 31 is fluid-tightly maintained by seal section SL constituted with seal constituting section 11h. With the above change in arrangement, in this embodiment, the above-mentioned support projection 17i formed at the inner peripheral surface of pump body 11 in the first embodiment for the purpose of restricting the maximum eccentric position of cam ring 17 is omitted.

With such an arrangement, when cam ring 17 is not operated (taking its maximum eccentric position), i.e., at a stage for raising the discharge pressure, the inside of first pressure chamber 31 can be fluid-tightly sealed with a similar degree to the first embodiment under the action of seal section SL. By this, the discharge pressure can be raised to first operational oil pressure Px set as a minimally required oil pressure during a low engine speed engine operation, with a suitable time (response). This can securely provide a required oil pressure during the low engine speed engine operation, such as required oil pressure P1 or the like for the valve timing control system.

When cam ring 17 is operated (making its swingable movement), i.e., at a stage for suppressing a rise in discharge pressure, each pressure chamber 31, 32 is sealed with small clearance C formed between each seal sliding surface 11c, 11d and each seal surface 17g, 17h. In this case, while a slight leak occurs through small clearance C, the discharge pressure exceeds first operational oil pressure Px so as to be put into a state to be suppressed in its rise at this stage, thereby permitting the above-mentioned leak.

The above-mentioned clearance C is set similar to the clearance in an axial direction between rotor 15 or cam ring 17 and the inner side surface 12c of cover member 12 or bottom wall 13a of pump accommodating chamber 13, or a clearance in a radial direction between the outer peripheral surface of a rotor and the inner peripheral surface of a housing in a known trochoid pump, so that clearance C is set basically to put leak within an allowable range.

Accordingly, according to this embodiment, by omitting seal members 30, 30 and the like, number of the component parts of oil pump 10 such as seal members 30, 30 and elastic members 29, 29 annexed to the seal members can be reduced. This achieves reduction in number of steps in assembling oil pump 10, thereby lowering a production cost of oil pump 10.

In addition, reduction of the number of the component parts of oil pump 10 can suppress occurrence of defects annexed to assembling, such as assembling failure, thereby stabilizing and improving the quality of oil pump 10.

FIGS. 19 to 22 illustrate a fourth embodiment of oil pump according to the present invention, which is similar to the first embodiment. Accordingly, this oil pump 10 has basically the same structure as the oil pump of the first embodiment, and is provided with oil pressure direction changeover valve 50 which is operated by the discharge pressure to change a discharge pressure characteristics, in place of solenoid valve 40 of the first embodiment.

Figure 19:
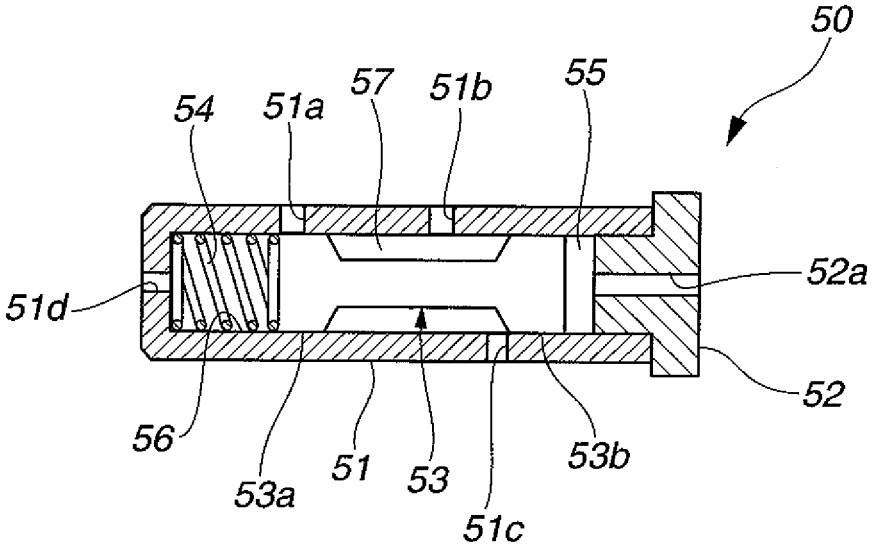
FIG. 19 is a cross-sectional view of an oil pressure direction changeover valve of a fifth embodiment of the variable displacement oil pump according to the present invention, showing an inoperative condition of the oil pressure direction changeover valve.
Figure 20:
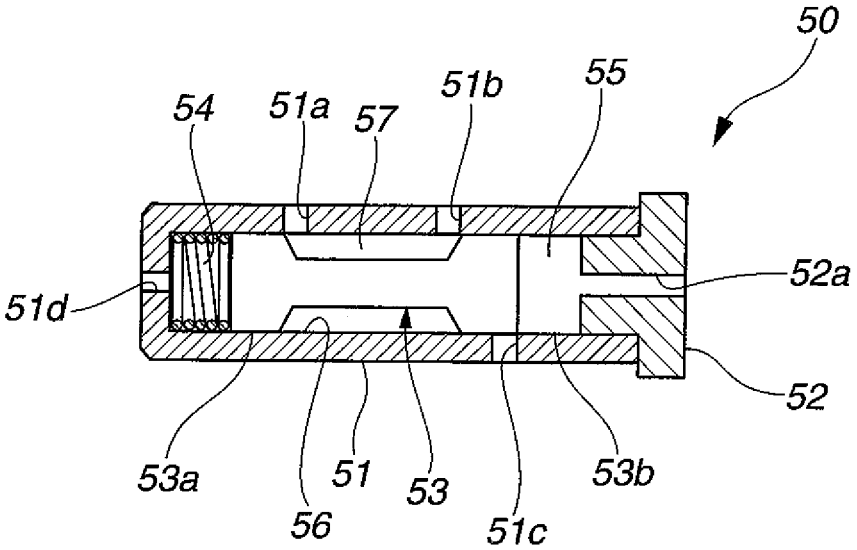
FIG. 20 is a cross-sectional view similar to FIG. 19 but showing an operative condition of the oil pressure direction changeover valve.
Figure 21:
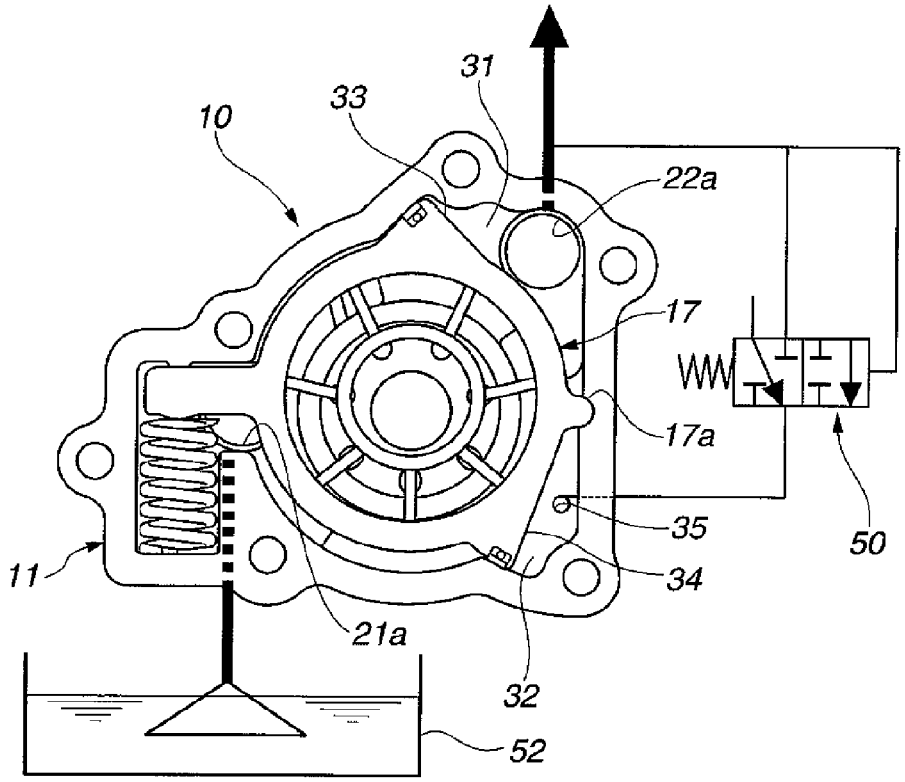
FIG. 21 is a diagram of a hydraulic circuit including a variable displacement oil pump according to the present invention.

Specifically, in this embodiment, in place of the above-mentioned solenoid valve 40, oil pressure direction changeover valve 50 of the known spool type is used. As shown in FIGS. 19 to 21, direction changeover valve 50 includes a cylindrical valve body 51 whose one end is opened while the other end is closed. Plug 52 closes the open end of valve body 51. Valve member 53 is axially slidably disposed in valve body 51 and is provided at its opposite end portions with first and second land portions 53a, 53b which define pressure chamber 55 and back pressure chamber 56 inside valve body 51. Spring 54 is accommodated within back pressure chamber 56 to bias valve member 53 toward the side of pressure chamber 55. Setting is made as follows: When the internal pressure of back pressure chamber 54 exceeds certain set pressure Pz higher than the above-mentioned required oil pressure P1 and lower than the above-mentioned required oil pressure P2, valve member 53 moves toward the side of back pressure chamber 56 against the biasing force of spring 54, as shown in FIG. 20.

Valve body 51 is formed at its peripheral wall with IN port 51a connected to discharge hole 22a, OUT port 51b connected to introduction hole 35 and drain port 51c connected to suction port 21 or the outside, each port being located at axial certain position of and formed piercing the peripheral wall of valve body 51. Additionally, back pressure port 51d is formed piercing the side wall defining back pressure chamber 56 in order to allow back pressure chamber 45 to be always released to be supplied with the suction pressure or the atmospheric pressure upon being connected to intake port 21 or the outside.

Plug 52 is screwed in a female screw section formed at the inner peripheral surface of an end portion of valve body 51 containing the open end. Introduction port 52a is formed piercing plug 52 and extends along the center axis of the plug, so that the discharge pressure is always introduced through introduction port 52a into pressure chamber 55.

The axially intermediate section of valve member 53 is formed smaller in diameter than other sections so that an annular space 57 is defined between land portions 53a, 53b, in which OUT port 51b can be communicated with IN port 51a or with drain port 51c through annular space 57. Specifically, when valve member 53 is in its inoperative state, IN port 51a is closed with first land portion 53a while OUT port 51b and drain port 51c are communicated with each other through annular space 57. When valve member 53 is operated, drain port 51c is closed with second land portion 53b while IN port 51a and OUT port 51b are communicated with each other through annular space 57.

Figure 22:
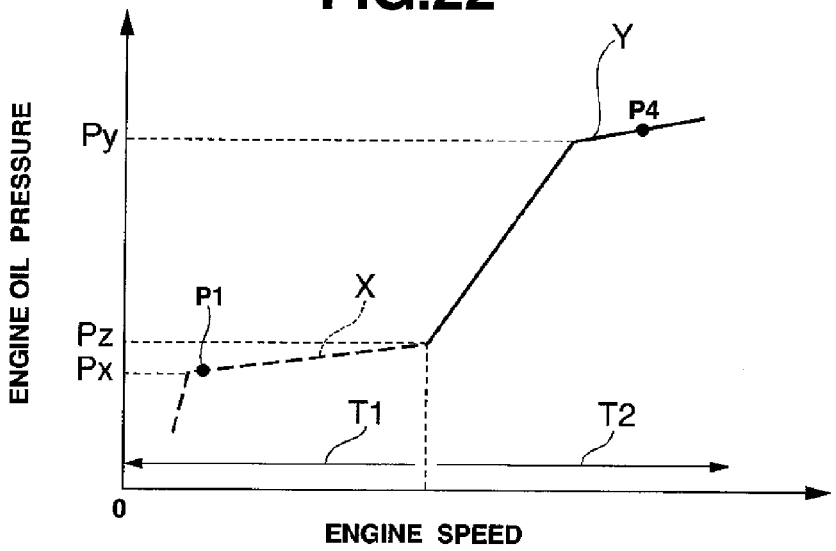
FIG. 22 is a graph showing the relationship between engine oil pressure and engine speed of an internal combustion engine on which the variable displacement oil pump of FIG. 21 is mounted.

With the above-discussed arrangement, according to oil pump 10 of this embodiment, in a condition where the engine speed of the engine is low, IN port 51a of oil pressure direction changeover valve 50 is closed so that the discharge pressure acts only on first pressure chamber 31. Consequently, as shown in FIG. 22, when the discharge pressure reaches first operational oil pressure Px, cam ring 17 makes its eccentric movement in a direction to decrease its eccentricity amount, thereby exhibiting the above-mentioned low pressure characteristics X for which the rise of the discharge pressure becomes gentle (corresponding to a zone T1 in FIG. 22). Then, when the discharge pressure rises so that the internal pressure of pressure chamber 55 reaches the above-mentioned set pressure Pz, valve member 53 begins to make its axial movement toward the side of back pressure chamber 55 against the biasing force of spring 53 under the action of the internal pressure of pressure chamber 55. With the axial movement of this valve member 52, the drain port 51c is closed with second land portion 53b while IN port 51a is opened to annular space 57. By this, IN port 51a and OUT port 51b are gradually brought into communication with each other through annular groove 57, so that the discharge pressure is introduced into second pressure chamber 32. As a result, the internal pressure of second pressure chamber 32 rises, by which cam ring 17 makes its eccentric movement in a direction to increase the eccentricity amount of cam ring 17, so that the discharge pressure is further increased thus exhibiting the above-mentioned high pressure characteristics Y (corresponding to a zone T2 in FIG. 22).

Thus, according to this embodiment, while oil pressure direction changeover valve 50 cannot accomplish a free changeover for the discharge pressure in accordance with engine operating conditions, like solenoid valve 40 in the first embodiment, it will be appreciated that this embodiment can provide an oil pump provided with a discharge pressure characteristics in relation to engine speed, with a low production cost.

It will be understood that the present invention is not limited to the arrangements of the above-mentioned embodiments, so that, for example, the above-mentioned required oil pressures P1 to P5, the above-mentioned first and second operational oil pressures Px, Py and the above-mentioned set pressure Pz may be freely changed in accordance with the specification of the internal combustion engine of a vehicle on which oil pump 10 is mounted.

Further, while the side walls of oil pump 10 of the present invention have been shown and described as being respectively the bottom wall of pump body 11 and cover member 12 as examples in the above embodiments, it will be understood that the side walls may be respectively separate members which are, for example, located on opposite sides of the pump element and respectively axially inside the bottom wall of pump body 11 and cover member 12 so that the side walls are separate and independent from the housing of oil pump 10.

Furthermore, although the operation of cam ring 17 has been shown and described as being controlled by balancing the internal pressure of first pressure chamber 31 and the sum of the biasing force of spring 18 and the internal pressure of second pressure chamber 32 in the above embodiments, it will be appreciated that the operation of cam ring 17 may be controlled only with the internal pressure (pressure difference) of both pressure chambers 31, 32 omitting spring 18 by setting the pressure receiving area of first pressure receiving surface 33 larger than the pressure receiving area of second pressure receiving surface 34, according to the specification of the oil pump.

Moreover, while the pressure receiving area of second pressure receiving surface 33 has been shown and described as being smaller than the pressure receiving area of first pressure receiving surface 33, it will be understood that the pressure receiving surfaces of first and second pressure receiving surfaces 33, 34 may be set equal to each other.

The entire contents of Japanese Patent Application No. 2009-54366, filed Mar. 9, 2009, are incorporated herein by reference.

Although the invention has been described above by reference to certain embodiments and examples of the invention, the invention is not limited to the embodiments and examples described above. Modifications and variations of the embodiments and examples described above will occur to those skilled in the art, in light of the above teachings. The scope of the invention is defined with reference to the following claims.

What is claimed is:

1. A variable displacement oil pump for supplying oil at least to sliding sections of an internal combustion engine, comprising:

a pump element including a rotor configured to be rotationally driven by the internal combustion engine, and a plurality of vanes disposed at an outer peripheral section of the rotor;

a cam ring having an inner peripheral section for accommodating the pump element thereinside, and an outer peripheral section having a swinging movement fulcrum, the cam ring being swingingly movable around the swinging movement fulcrum to change an eccentricity amount of the cam ring relative to an axis of the rotor;

a housing for accommodating the cam ring thereinside and including side walls disposed respectively on axially opposite sides of the cam ring to define a plurality of hydraulic fluid chambers each of which is defined by the rotor and adjacent ones of the vanes, the housing further including: a discharge section in which volumes of the hydraulic fluid chambers decrease along the discharge section in a rotational direction of the rotor to realize pumped oil, a first pressure chamber bounded by the outer peripheral section of the cam ring and an inner surface of the housing, a discharge hole opened through at least one of the side walls to discharge the pumped oil from the variable displacement oil pump, with the first pressure chamber opening to the discharge hole, and a suction hole opened through at least one of the side walls to supply oil to a suction section in which volumes of the hydraulic chambers increase along the rotational direction of the rotor;

a biasing member for biasing the cam ring in a direction to increase the eccentricity amount of the cam ring relative to the axis of the rotor;

the first pressure chamber having a first pressure receiving surface on the outer peripheral section of the cam ring, and directly connected to the discharge section via an open valve-less path, to constantly receive a discharge pressure of the pumped oil fed into the first pressure chamber from the discharge section, to allow the discharge pressure to be applied through the first pressure receiving surface to the cam ring to oppose to a biasing force of the biasing member so as to provide the cam ring with a swinging force in a direction to decrease the eccentricity amount of the cam ring;

a second pressure chamber defined by the outer peripheral section of the cam ring and the housing, and having a second pressure receiving surface on the outer peripheral section of the cam ring, where introduction of the same discharge pressure that is introduced into the first pressure chamber causes the discharge pressure to be applied through the second pressure receiving surface to the cam ring to assist the biasing force of the biasing member so as to provide the cam ring with a swinging force in a direction to increase the eccentricity amount of the cam ring, the second pressure receiving surface being set smaller in pressure receiving area than the first pressure receiving surface; and a hydraulic switch for changeover controlling supply of the discharge pressure to the second pressure chamber, based on an energizing current.

2. A variable displacement oil pump as claimed in claim 1, where the hydraulic switch is selectable between a first state where the second pressure chamber is connected via a first hydraulic path to receive the discharge pressure, and a second state where the second pressure chamber is connected via a second hydraulic path to release pressurization to achieve a pressure lower than the discharge pressure.

3. A variable displacement oil pump as claimed in claim 2, wherein the hydraulic switch has a configuration to establish the first state in a current supply condition, and to establish the second state in a non-current supply condition.

4. A variable displacement oil pump as claimed in claim 2, wherein the hydraulic switch has a configuration to establish the second state in a current supply condition, and to establish the first state in a non-current supply condition.

5. A variable displacement oil pump as claimed in claim 3, wherein the hydraulic switch is a solenoid valve.

6. A variable displacement oil pump as claimed in claim 1, further comprising a control device configured to control the hydraulic switch in accordance with an engine speed of the engine.

7. A variable displacement oil pump as claimed in claim 1, further comprising a control device configured to control the hydraulic switch in accordance with an engine load of the engine.

8. A variable displacement oil pump as claimed in claim 1, further comprising a control device configured to control the hydraulic switch in accordance with an oil temperature of the engine.

9. A variable displacement oil pump as claimed in claim 1, wherein each of the first and second pressure chamber is defined by an outer peripheral surface of the cam ring, an inner peripheral surface of the housing and the swinging movement fulcrum of the cam ring.

10. A variable displacement oil pump as claimed in claim 9, wherein a region within the housing and outside the cam ring, except for the first and second pressure chambers, is set at atmospheric pressure or a suction pressure.

11. A variable displacement oil pump as claimed in claim 10, wherein the biasing member is disposed at a site where the atmospheric pressure or the suction pressure is set, in the region outside the cam ring.

12. A variable displacement oil pump for supplying oil at least to sliding sections of an internal combustion engine, comprising:

a pump element including a rotor configured to be rotationally driven by the internal combustion engine, and a plurality of vanes disposed at an outer peripheral section of the rotor; a cam ring having an inner peripheral section for accommodating the pump element thereinside, and an outer peripheral section having a swinging movement fulcrum, the cam ring being swingingly movable around the swinging movement fulcrum to change an eccentricity amount of the cam ring relative to an axis of the rotor;

a housing for accommodating the cam ring thereinside and including side walls disposed respectively on axially opposite sides of the cam ring to define a plurality of hydraulic fluid chambers each of which is defined by the rotor and adjacent ones of the vanes, the housing further including: a discharge section in which volumes of the hydraulic fluid chambers decrease along the discharge section in a rotational direction of the rotor to realize pumped oil, a first pressure chamber bounded by the outer peripheral section of the cam ring and an inner surface of the housing, a discharge hole opened through at least one of the side walls to discharge the pumped oil from the variable displacement oil pump, with the first pressure chamber opening to the discharge hole, and a suction hole opened through at least one of the side walls to supply oil to a suction section in which volumes of the hydraulic chambers increase along the rotational direction of the rotor;

a biasing member for biasing the cam ring in a direction to increase the eccentricity amount of the cam ring relative to the axis of the rotor;

the first pressure chamber having a first pressure receiving surface on the outer peripheral section of the cam ring, and directly connected to the discharge section via an open valve-less path, to constantly receive a discharge pressure of the pumped oil fed into the first pressure chamber from the discharge section, before the pumped oil is discharged out of the discharge hole of the oil pump, to allow the discharge pressure to be applied through the first pressure receiving surface to the cam ring to oppose to a biasing force of the biasing member, so as to provide the cam ring with a swinging force in a direction to decrease the eccentricity amount of the cam ring;

a second pressure chamber defined by the outer peripheral section of the cam ring and the housing, and having a second pressure receiving surface on the outer peripheral section of the cam ring, where introduction of the same discharge pressure that is introduced into the first pressure chamber, causes the discharge pressure to be applied through the second pressure receiving surface to the cam ring to assist the biasing force of the biasing member so as to provide the cam ring with a swinging force in a direction to increase the eccentricity amount of the cam ring, the second pressure receiving surface being set smaller in pressure receiving area than the first pressure receiving surface; and a hydraulic switch for changeover controlling supply of the discharge pressure to the second pressure chamber, based on an energizing current;

wherein a part of the first pressure chamber is disposed overlapping with the discharge section in a radial direction of the rotor.

13. A variable displacement oil pump as claimed in claim 12, wherein whole of each of the first and second pressure chambers is disposed overlapping with a range of the discharge section, in the radial direction of the rotor.

14. A variable displacement oil pump as claimed in claim 12, wherein a whole of each of the first and second pressure chambers is disposed overlapping with a peripheral direction range in which the discharge section is formed.

15. A variable displacement oil pump for supplying oil at least to sliding sections of an internal combustion engine, comprising:

a pump element including a rotor configured to be rotationally driven by the internal combustion engine, and a plurality of vanes disposed at an outer peripheral section of the rotor;

a cam ring having an inner peripheral section for accommodating the pump element thereinside, and an outer peripheral section having a swinging movement fulcrum, the cam ring being swingingly movable around the swinging movement fulcrum to change an eccentricity amount of the cam ring relative to an axis of the rotor;

a housing for accommodating the cam ring thereinside and including side walls disposed respectively on axially opposite sides of the cam ring to define a plurality of hydraulic fluid chambers each of which is defined by the rotor and adjacent ones of the vanes, the housing further including: a discharge section in which volumes of the hydraulic fluid chambers decrease along the discharge section in a rotational direction of the rotor to realize pumped oil, a first pressure chamber bounded by the outer peripheral section of the cam ring and an inner surface of the housing, a discharge hole opened through at least one of the side walls to discharge the pumped oil from the variable displacement oil pump, with the first pressure chamber opening to the discharge hole of the oil pump, and a suction hole opened through at least one of the side walls to supply oil to a suction section in which volumes of the hydraulic chambers increase along the rotational direction of the rotor;

a biasing member for biasing the cam ring in a direction to increase the eccentricity amount of the cam ring relative to the axis of the rotor;

the first pressure chamber having a first pressure receiving surface on the outer peripheral section of the cam ring, and directly connected to the discharge section via an open valve-less path, to constantly receive a discharge pressure of the oil pump fed into the first pressure chamber from the discharge section, before the pumped oil is discharged out of the discharge hole of the oil pump, to allow the discharge pressure to be applied through the first pressure receiving surface to the cam ring to oppose to a biasing force of the biasing member so as to provide the cam ring with a swinging force in a direction to decrease the eccentricity amount of the cam ring; and a second pressure chamber defined by the outer peripheral section of the cam ring and the housing, and having a second pressure receiving surface on the outer peripheral section of the cam ring, where introduction of the same discharge pressure that is introduced into the first pressure chamber causes the discharge pressure to be applied through the second pressure receiving surface to the cam ring to assist the biasing force of the biasing member so as to provide the cam ring with a swinging force in a direction to increase the eccentricity amount of the cam ring, the second pressure receiving surface being set smaller in pressure receiving area than the first pressure receiving surface;

a hydraulic switch for changeover controlling supply of the discharge pressure to the second pressure chamber, based on an energizing current;

wherein the first and second pressure chambers are disposed nearer to the swinging movement fulcrum than to the axis of the rotor.

16. A variable displacement oil pump as claimed in claim 15, wherein the singing movement fulcrum is a pivot formed integral with the outer peripheral section of the cam ring.

17. A variable displacement oil pump as claimed in claim 16, wherein each of the first and second pressure chambers is defined by an outer peripheral surface of the cam ring, and an inner peripheral surface of the housing, and are separated from each other by the fulcrum.

18. A variable displacement oil pump as claimed in claim 16, wherein the pivot is swingably movably disposed supported in a depression formed in the inner peripheral section of the housing.

19. A variable displacement oil pump as claimed in claim 15, wherein a region outside the cam ring, except for the first and second pressure chambers, is set at atmospheric pressure or a suction pressure.

*20. A variable displacement oil pump for supplying oil at least to sliding sections of an internal combustion engine, comprising:*

*a pump element including a rotor configured to be rotationally driven by the internal combustion engine, and a plurality of vanes disposed at an outer peripheral section of the rotor;*

*a ring having an inner peripheral section for accommodating the pump element thereinside, and an outer peripheral section, the ring being movable to change a position of the ring relative to an axis of the rotor;*

*a housing for accommodating the ring thereinside and including side walls disposed respectively on axially opposite sides of the ring to define a plurality of hydraulic fluid chambers each of which is defined by the rotor and adjacent ones of the vanes, the housing further including:*

*a discharge section in which volumes of the hydraulic fluid chambers decrease along a rotational direction of the rotor to realize pumped oil,*

*a first pressure chamber bounded by the outer peripheral section of the ring and an inner surface of the housing,*

*a discharge hole opened through at least one of the side walls to discharge the pumped oil from the variable displacement oil pump, and*

*a suction hole opened through at least one of the side walls to supply oil to a suction section in which volumes of the hydraulic chambers increase along the rotational direction of the rotor;*

*a biasing member for biasing the ring in a direction to increase differentiation in volume of the hydraulic fluid chambers;*

*the first pressure chamber having a first pressure receiving surface on the outer peripheral section of the ring, and the first pressure chamber being connected to the discharge section via an open valve-less path, to receive a discharge pressure of the pumped oil fed into the first pressure chamber from the discharge section, to allow the discharge pressure to be applied through the first pressure receiving surface to the ring to provide the ring with a force against the biasing force of the biasing member in a direction to decrease differentiation in volume of the hydraulic fluid chambers;*

*a second pressure chamber defined by the outer peripheral section of the ring and the housing, and having a second pressure receiving surface on the outer peripheral section of the ring, where introduction of the pumped oil from the same discharge section that is introduced into the first pressure chamber causes a discharge pressure to be applied through the second pressure receiving surface to the ring to assist the biasing force of the biasing member so as to provide the ring with a force in a direction to increase a moving amount of the ring, the second pressure receiving surface being set different in pressure receiving area from the first pressure receiving surface; and*

*a controller configured to be electrically driven for changeover controlling supply of the hydraulic fluid to the second pressure chamber, based on an energizing current, and allowing the second pressure chamber to be opened to an atmospheric environment.*

*21. A variable displacement oil pump as claimed in claim 20, wherein the ring comprises a cam ring, and the outer peripheral section of the ring has a swinging movement fulcrum.*

*22. A variable displacement oil pump as claimed in claim 20, wherein the first pressure chamber is directly connected to the discharge section.*

*23. A variable displacement pump, comprising:*

*a housing;*

*a pump element movably contained in the housing to suck and discharge hydraulic fluid, volumes of the hydraulic fluid discharged by the pump element being changed according to the position of the pump element;*

*a biasing element that biases the pump element in a direction for increasing the discharged volumes of the hydraulic fluid;*

*a first control fluid chamber defined between the pump element and the housing, the hydraulic fluid discharged from the pump element being introduced into the first chamber, the pump element being moved in a direction for decreasing the discharged volumes of the hydraulic fluid by the hydraulic fluid being introduced into the first chamber;*

*a second control fluid chamber defined between the pump element and the housing, the second chamber being separately formed from the first chamber, the hydraulic fluid discharged from the pump element being introduced into the second chamber, the pump element being moved in a direction for increasing the discharged volumes of the hydraulic fluid by the hydraulic fluid being introduced into the second chamber; and*

*an electrically controlled valve that is provided in a fluid passage that guides the hydraulic fluid discharged from the pump element to the second chamber,*

*the valve including a first condition for allowing the hydraulic fluid discharged from the pump element to be therethrough introduced into the second chamber and a second condition for allowing the second chamber to be opened to atmospheric environment,*

*the valve being maintained in the second condition when the valve is deenergized.*

*24. A variable displacement pump as claimed in claim 23, wherein the valve comprises:*

*a body,*

*a valve member that moves between the first condition and the second condition,*

*an elastic member that biases the valve in a direction such that the valve member is placed in the second condition, and*

*an actuator that is electrically driven to bias the valve member in a direction such that the valve member is placed in the first condition.*

*25. A variable displacement pump as claimed in claim 24, wherein*

*the valve member is controlled between the first condition and the second condition.*

*26. A variable displacement pump as claimed in claim 23, wherein*

*the valve includes an inlet port connected to a discharged port of the pump element, an outlet port connected to the second chamber, and a drain port connected to the atmosphere.*

* * * * *